United States Patent [19]

McDonald

[11] 4,304,046

[45] Dec. 8, 1981

[54] MOBILE WOODEN TRUSS FABRICATING APPARATUS

[76] Inventor: William D. McDonald, Rte. 1, Box 322C, Monroe, Oreg. 97456

[21] Appl. No.: 76,778

[22] Filed: Sep. 18, 1979

Related U.S. Application Data

[63] Continuation-in-part of Ser. No. 913,247, Jun. 6, 1978, Pat. No. 4,174,061.

[51] Int. Cl.[3] ........................ B23P 19/00; B25B 27/14; B23Q 3/00

[52] U.S. Cl. ........................................ 29/798; 29/281.3; 100/913; 227/152; 269/910

[58] Field of Search ..................... 29/281.1, 281.3, 432, 29/464, 467, 468, 716, 798; 100/DIG. 13; 227/152; 269/910

[56] References Cited

U.S. PATENT DOCUMENTS

| | | | |
|---|---|---|---|
| 3,068,483 | 12/1962 | Moehlenpah et al. | 100/DIG. 13 |
| 3,241,585 | 3/1966 | Jureit | 269/910 X |
| 3,367,010 | 2/1968 | Lytle et al. | 100/DIG. 13 |
| 3,379,354 | 4/1968 | Moehlenpah et al. | 100/DIG. 13 |
| 3,487,430 | 12/1969 | Schmitt | 100/DIG. 13 |
| 3,599,562 | 8/1971 | Hutchens | 227/152 X |
| 3,711,007 | 1/1973 | Fry | 227/152 X |
| 3,752,467 | 8/1973 | Stanley | 269/910 X |
| 4,084,499 | 4/1978 | Moehlenpah | 100/DIG. 13 |
| 4,111,114 | 9/1978 | Carr | 100/DIG. 13 |
| 4,148,471 | 4/1979 | Werner | 269/910 X |

*Primary Examiner*—Ervin M. Combs
*Attorney, Agent, or Firm*—D. Paul Weaver

[57] ABSTRACT

A trailer bed or chassis including side rail extensions and center rail support posts serves to mount a wooden truss fabricating jig including laterally adjustable center rail sections and associated transverse arms for the support of truss lumber. An arrangement of permanent stops and swivel stops on the jig together with a truss peak locator and splice locator enable the setting up on the job site of a calibrated jig prior to placing the truss lumber thereon, resulting in a great savings of time in truss fabrication. Trusses are produced with precision and uniformity having improved quality and a wider range of truss sizes can be accommodated with the apparatus because of its versatility.

23 Claims, 48 Drawing Figures

FIG. 8
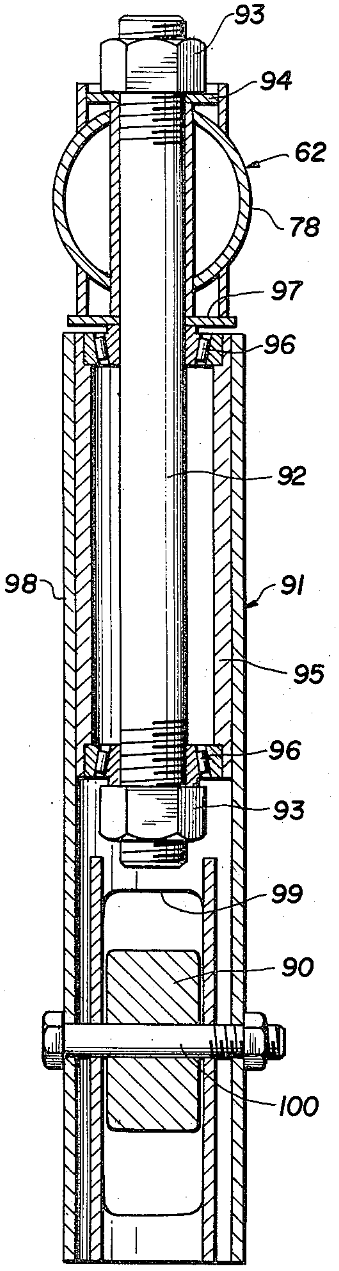
FIG. 9
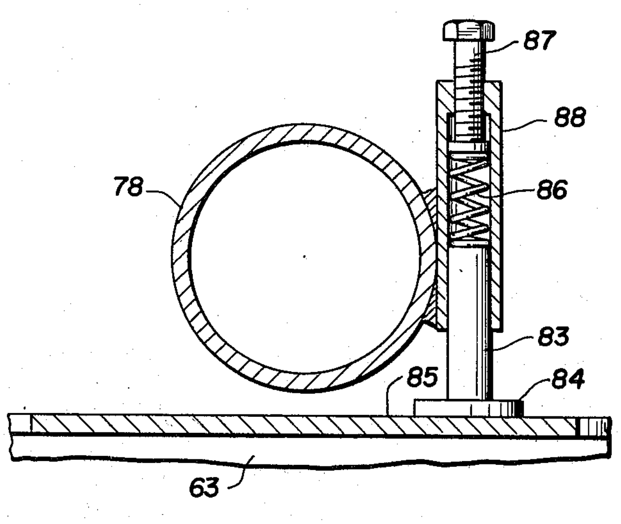
FIG. 14
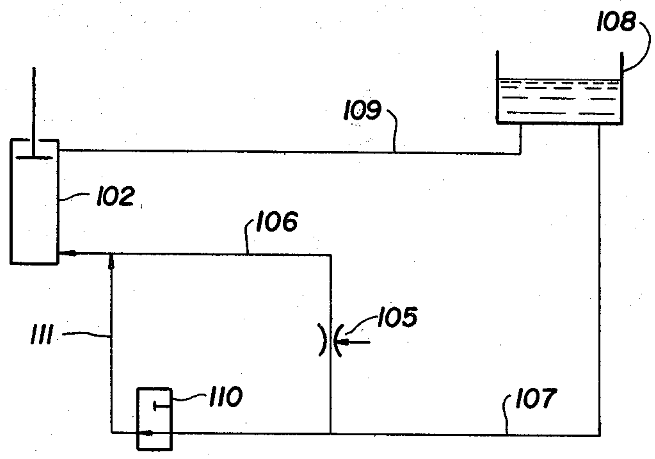
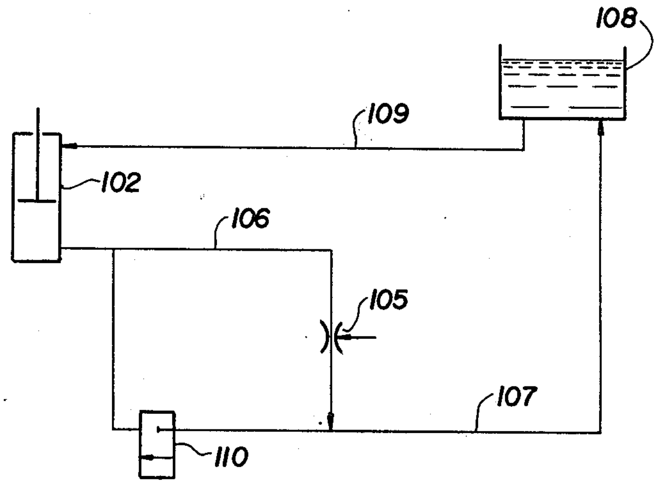
FIG. 15

FIG. 33
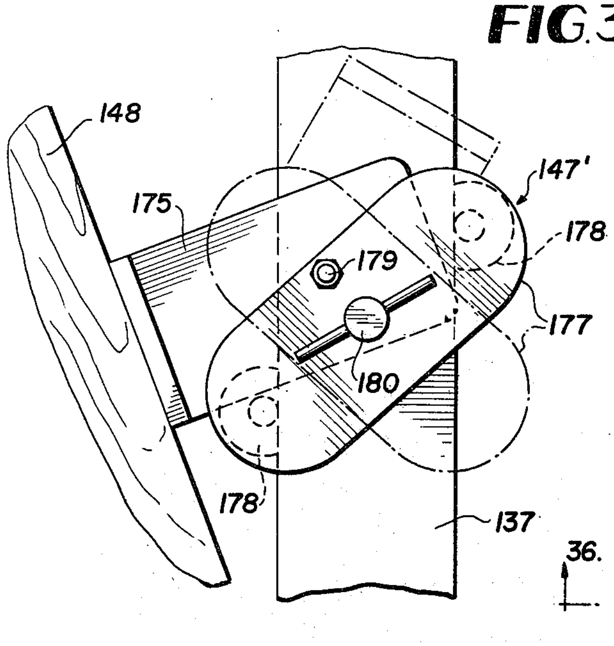
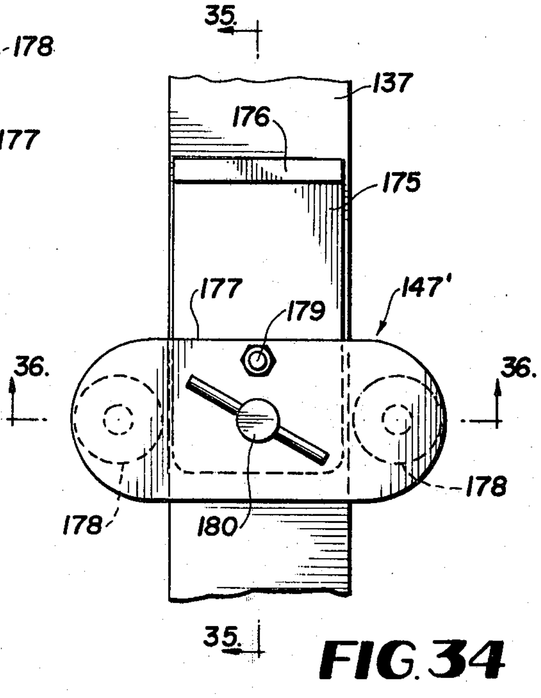
FIG. 34
FIG. 35
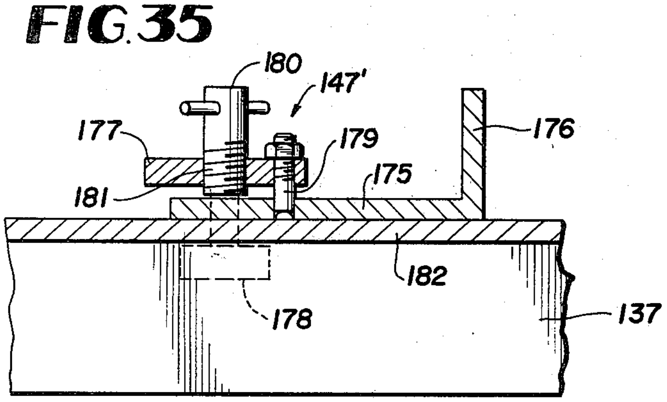
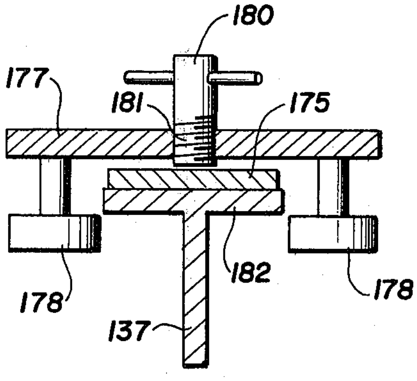
FIG. 36

FIG. 42
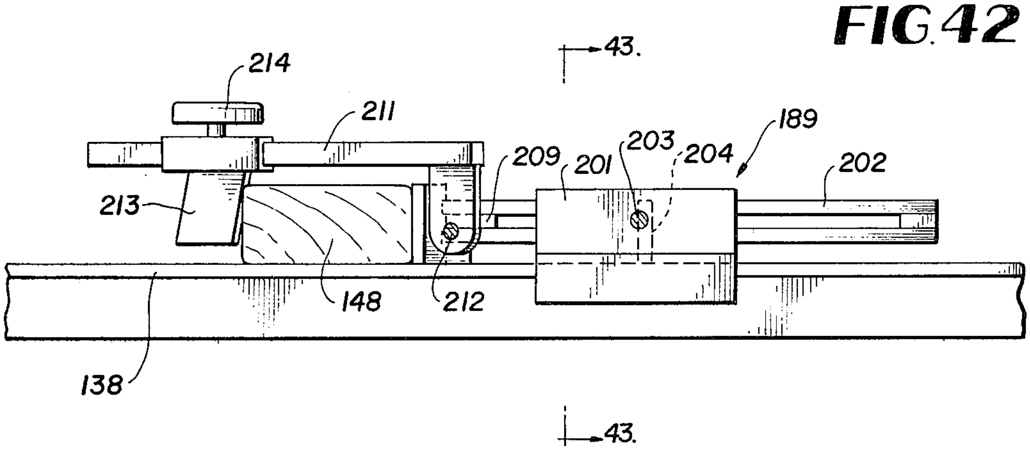
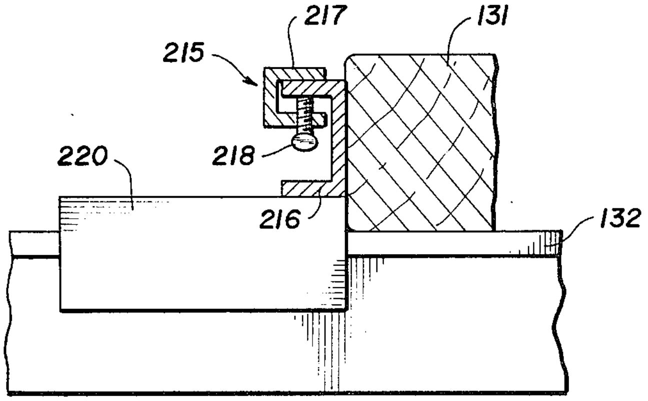
FIG. 40
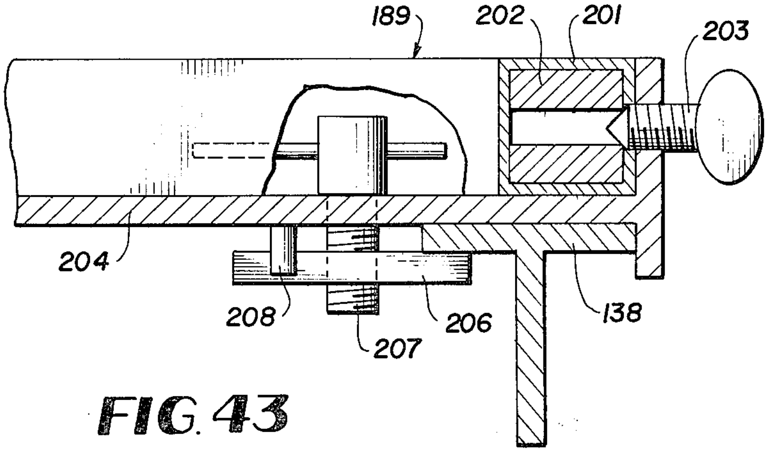
FIG. 43

MOBILE WOODEN TRUSS FABRICATING APPARATUS

CROSS-REFERENCE TO RELATED APPLICATION

This application is a continuation-in-part of prior copending application Ser. No. 913,247, filed June 6, 1978, for PORTABLE APPARATUS FOR FABRICATING WOODEN TRUSSES, now U.S. Pat. No. 4,174,061.

BACKGROUND OF THE INVENTION

The objective of the present invention is to improve on the wooden truss fabricating apparatus in the above referenced application in two main areas. Firstly, the construction and mode of operation of the dual articulated and counterbalanced boom arrangement has been greatly improved by rendering it more simplified and positive in its operation and also safer to use for its intended purpose. Secondly, a unique fabricating jig for the trailer bed or chassis of the apparatus has been provided as a principal component of the present invention. This highly versatile jig enables the rapid construction at the job site of wooden trusses with high precision and dimensional stability and uniformity, resulting from the strategic placement on the jig of a series of swivel stops and permanent stops to position truss lumber on the jig prior to the application of nailing plates thereto by means of a power press carried by the articulated boom structure. Means are also provided on the jig to precisely locate the peak of a truss undergoing fabrication and to locate a splice with repetitive accuracy in the lower main chord of each truss.

By means of the highly versatile precision jig arrangement, the jig can be completely adjusted or "set up" on the job site before the placement of the truss lumber thereon, thus eliminating the necessity for the operator to delay setting up the jig until the truss lumber is cut. This constitutes a very important aspect of the invention.

PRIOR ART

Prior U.S. Pat. No. 3,367,010 discloses a jig for assembling roof trusses. The patent discloses a stationary unit not intended to be used on a transport trailer or other mobile bed. A more important distinction between the patented device and the present invention is the fact that the patented device requires the complete precutting of the truss lumber and the temporary tacking together of the lumber prior to adjusting camming devices on the patented jig which hold the truss lumber during the placement of nailing plates across the truss member joints. The mode of operation of the invention is essentially the reverse of that employed in U.S. Pat. No. 3,367,010 with a resulting considerable savings in the time of truss fabrication as well as improved accuracy and repetitive uniformity of truss dimensions.

BRIEF DESCRIPTION OF THE DRAWINGS

FIG. 8 is an enlarged central vertical section taken on line 8—8 of FIG. 7.

FIG. 9 is a similar section taken on line 9—9 of FIG. 7.

FIGS. 14 and 15 are fluid schematics depicting the operation of the system in FIG. 13.

FIG. 33 is a fragmentary plan view showing a second and preferred form of swivel stop in an engaged position.

FIG. 34 is a further plan view of the swivel stop in a release position.

FIG. 35 is a fragmentary vertical section taken on line 35—35 of FIG. 34.

FIG. 36 is a fragmentary vertical section taken on line 36—36 of FIG. 34.

FIG. 40 is an enlarged fragmentary vertical section taken on line 40—40 of FIG. 39.

FIG. 42 is a side elevational view, partly in section, of the structure shown in FIG. 41.

FIG. 43 is a fragmentary vertical section taken on line 43—43 of FIG. 42.

DETAILED DESCRIPTION

Figure 1:
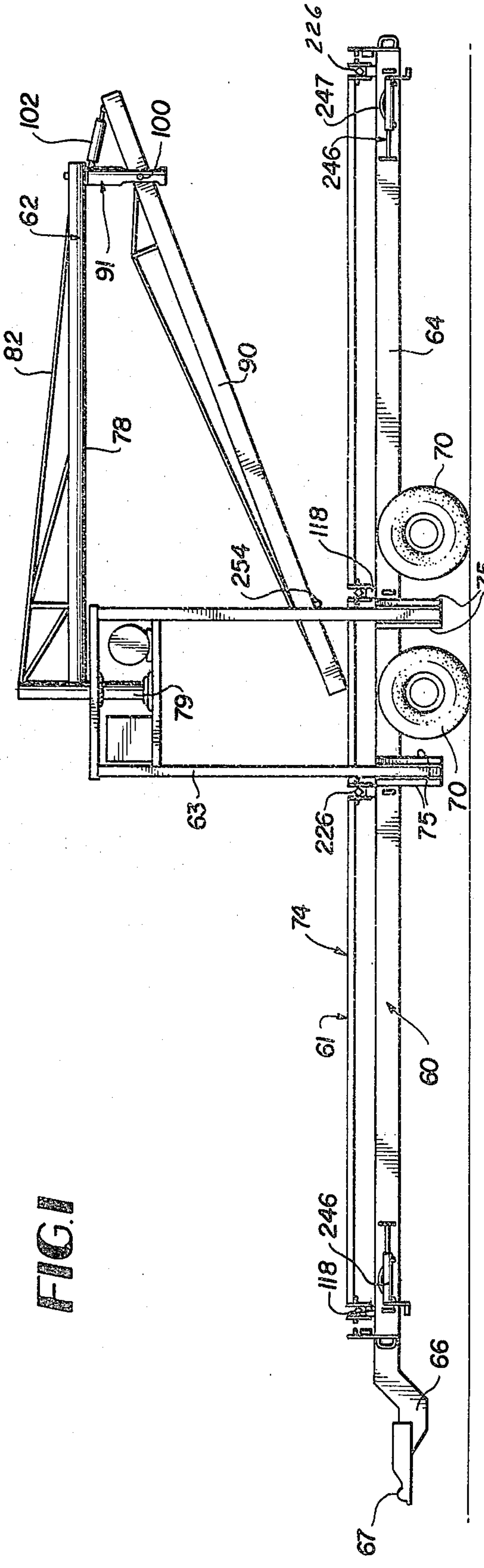
FIG. 1 is a side elevation of a wooden truss fabricating apparatus arranged for roadway transport.
Figure 2:
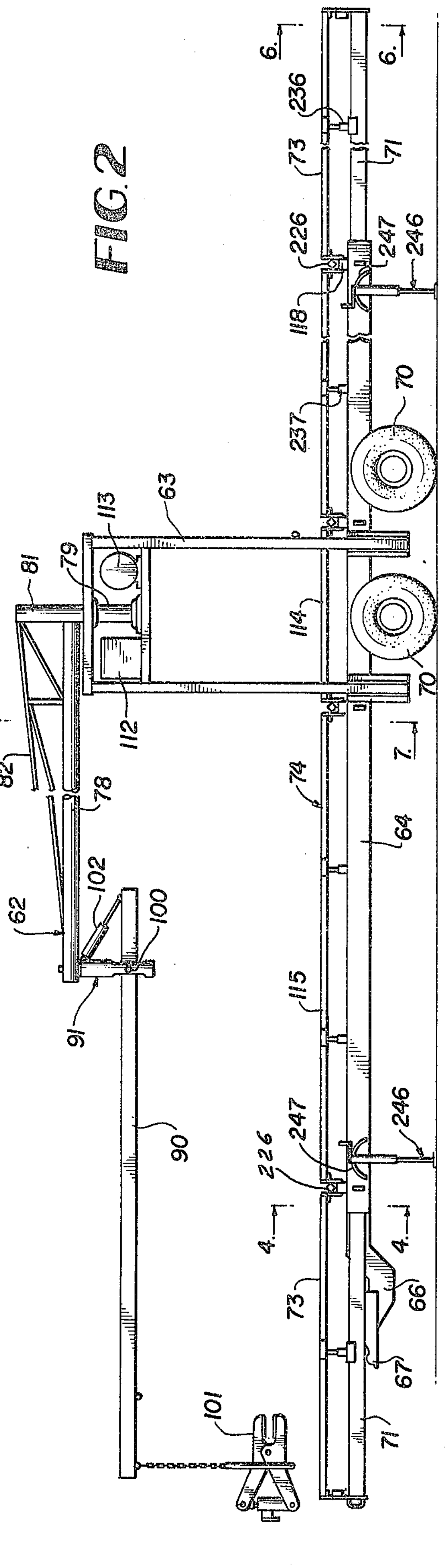
FIG. 2 is a side elevation of the apparatus deployed for use.

Referring to the drawings in detail wherein like numerals designate like parts, reference is made first to FIGS. 1 and 2 of the drawing which depict in its entirety a mobile truss fabricating or manufacturing apparatus according to the invention. In its basic components, the apparatus comprises a trailer bed 60, a truss fabricating jig 61 on the bed 60, and a dual articulated boom 62 mounted on a tower 63 supported at one side of the bed 60 near the longitudinal center thereof.

Figure 3:
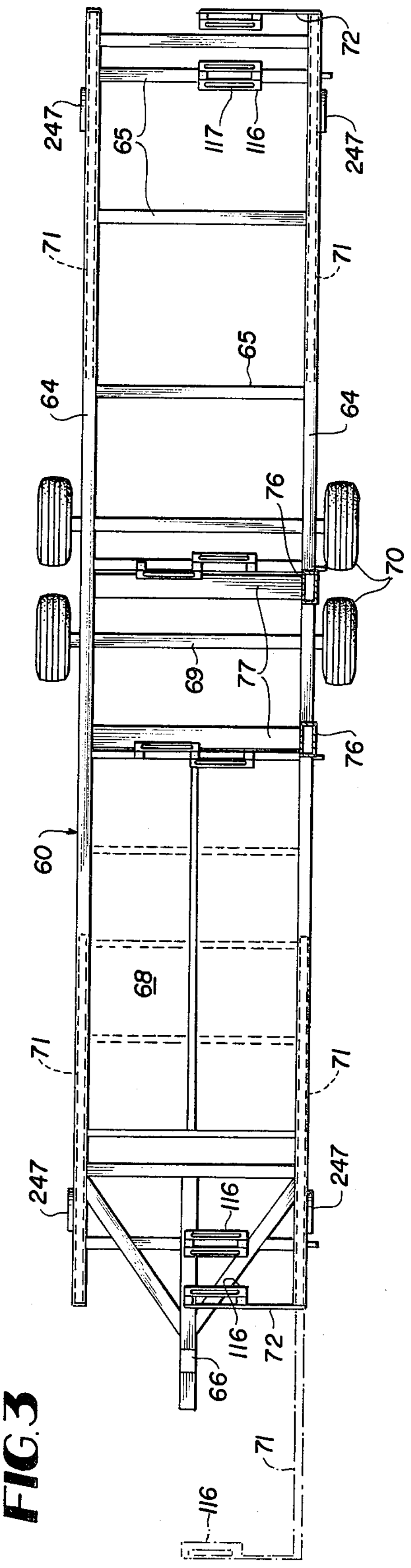
FIG. 3 is a plan view of a mobile trailer bed with the jig and boom components removed.

As shown in FIG. 3, the trailer bed 60 comprises main parallel side rails 64 rigidly interconnected by spaced cross braces 65. A draft tongue 66 carrying a ball hitch 67, FIG. 1, is provided on the forward end of the trailer bed 60. A floored storage area 68 is preferably provided behind the draft tongue 66 and transverse wheel axles 69 carrying wheels 70 span the bed 60 near the longitudinal center thereof.

The main side rails 64 are equipped with fore and aft longitudinal telescoping extension rails 71 by means of which the bed 60 may be lengthened at a job site to enable the fabrication of larger size trusses. Transverse support arms 72 carried by the extension rails 71 of one main longitudinal rail 64 enable the supporting at the job site of longitudinal extension 73, FIG. 2, of the main longitudinal jig rail 74, as will be further described.

Figure 7:
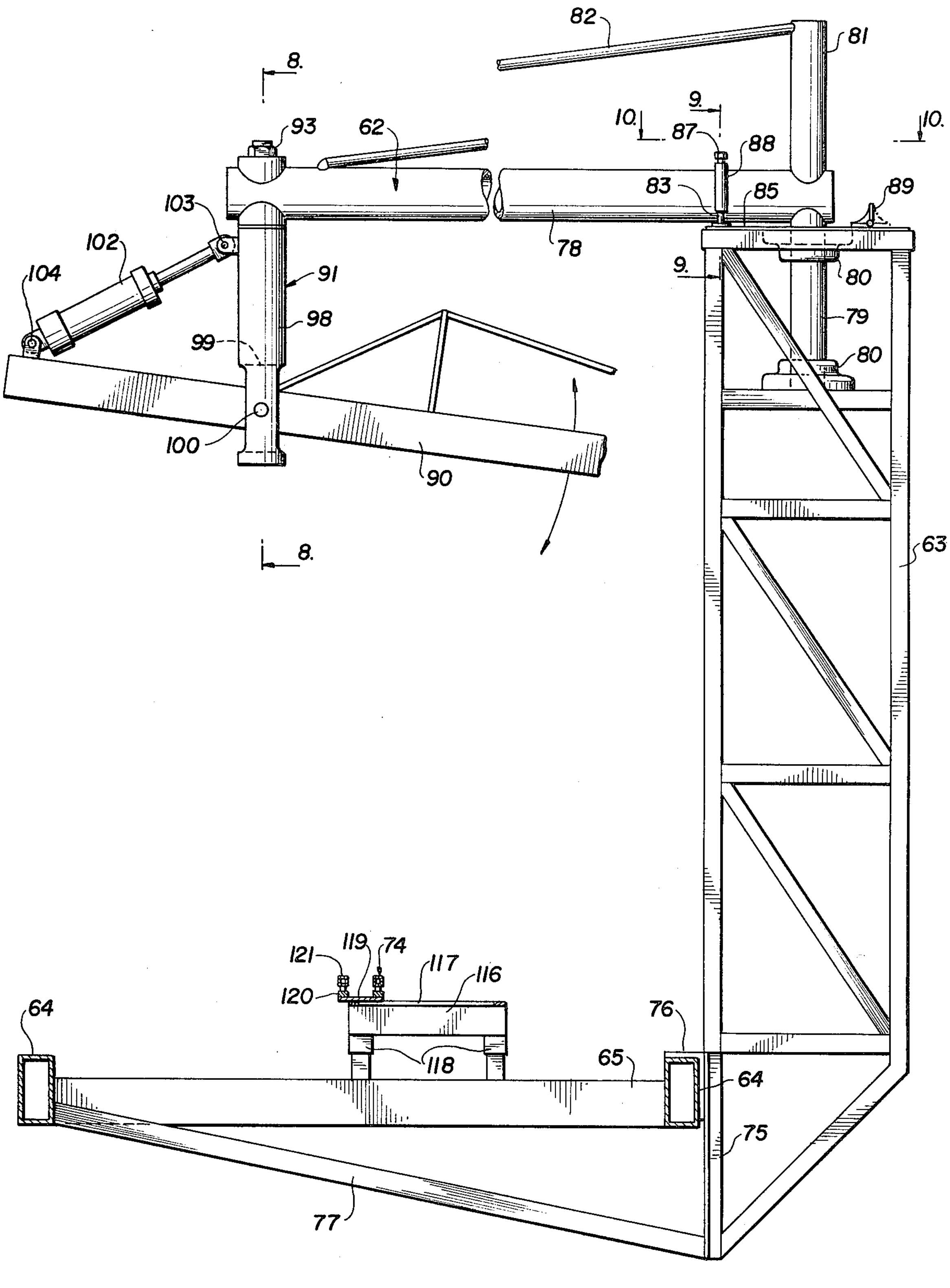
FIG. 7 is an enlarged fragmentary transverse vertical section taken substantially on line 7—7 of FIG. 2.

At one side of the trailer bed 60, paired angle brackets 75 for the support of boom tower 63 are rigidly attached to the adjacent main rail 64 through sturdy angle brackets 76. Inclined braces 77 connect the bottoms of angle brackets 75 with the opposite side main rail 64 for lateral rigidity of the angle brackets and for stabilizing the boom tower 63 which rises from the angle brackets 75, as illustrated in FIGS. 1, 2 and 7.

The articulated boom 62 supported on the tower 63 comprises a first or main horizontal boom section 78 having the ability to rotate in either direction in excess of a full 360 degrees around the vertical axis of a swivel mast 79 fixed within the top end portion of the tower 63. As shown in FIG. 7, the swivel mast 79 rotates in large coaxial bearings 80 fixed to the tower 63 and the swivel mast projects above the boom section 78 as at 81 and is connected to a point near the forward end of the boom section 78 through a tension brace 82.

A controlled drag on the horizontal rotation of boom section 78 is provided as shown in FIG. 9 by a spring-urged vertical drag pin 83 having a foot plate 84 frictionally contacting a flat plate 85 at the top of the tower 63, the drag pin 83 being eccentrically disposed relative to the axis of swivel mast 79. The tension of biasing spring 86 on drag pin 83 to meet the requirements of the individual operator is controlled by an adjusting screw 87 threaded into the top of a sleeve 88 which houses the drag pin and spring and is attached by welding, FIG. 9, to one side of the boom section 78.

Figure 10:
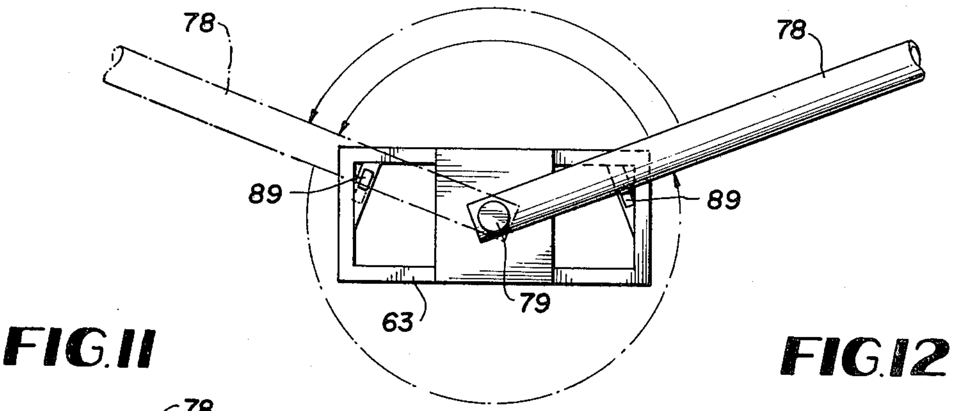
FIG. 10 is a horizontal section, partly schematic, taken on line 10—10 of FIG. 7.
Figure 11:
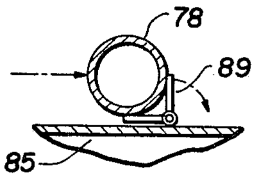
FIG. 11 is a fragmentary elevational view of a pivoted boom stop in a first position.
Figure 12:
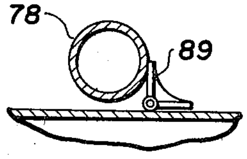
FIG. 12 is a similar view of the pivoted boom stop in a second position.

To prevent twisting and damaging of hoses and/or cables which are associated with the boom structure, rotation of the boom around the vertical axis of the mast 79 is limited so that continuous rotation in either direction cannot take place. However, as stated, the boom is free to rotate more than a full circle horizontally in either direction. This rotation limiting means for the horizontal boom section 78 comprises in FIGS. 7 and 10 through 12 a pair of pivoted L-stops 89 on top of the tower 63 or "flip" stops disposed in the path of horizontal movement of the rotating boom section 78. The two flip stops 89, FIG. 10, are spaced equidistantly on opposite sides of the rotational axis of the mast 79 and the two flip stops are spaced apart circumferentially a distance greater than 180 degrees, such as about 240 degrees. Thus, when the boom section 78 is rotated in one direction, namely counterclockwise in FIG. 10, it will be engaging the upright wall of the right hand flip stop in FIG. 10, as shown in FIG. 12, and therefore could not rotate clockwise. In rotating counterclockwise, however, the boom section 78 will encounter the left hand stop 89 in FIG. 10 in the manner shown in FIG. 11 and flip it over 90 degrees and continue to rotate back to the right hand stop 89 which also will be flipped over 90 degrees by the boom section 78. The boom section will therefore pass the right hand stop and continue moving back to the left hand stop 89 which is now conditioned to stop the counterclockwise rotation of the boom section 78 after it has traveled considerably more than 360 degrees, namely about 480 degrees. The boom section 78 is now free to rotate clockwise an equal distance until finally stopped after an equal amount of rotation in the clockwise direction by the right hand flip stop 89 in FIG. 10. The arrangement allows the articulated and rotatable boom structure to service all areas of the truss undergoing construction as in FIGS. 21 and 22, but prevents twisting and damaging of hoses or cables, as stated.

The articulated boom 62 additionally comprises a second lower elevation boom section 90 which can rotate horizontally independently of the boom section 78 around the vertical axis of a swivel 91 which interconnects the two boom sections. The swivel 91, FIG. 8, includes adjustable means to retard and regulate the horizontal rotation of boom section 90 with a desired degree of freedom and restraint. Such means comprises an interior tension shaft 92 having screw-threaded opposite ends which carry adjusting nuts 93, the upper nut 93 bearing solidly on a plate 94 forming a part of boom section 78. An interior sleeve 95 surrounds the shaft 92 and forms at its opposite ends the seats for the outer races of two axially spaced roller bearings 96. The inner race of the lower bearing 96 is engaged by the lower nut 93 and the inner race of the upper bearing 96 engages a plate 97 attached to boom section 78.

The swivel 91 includes an outer sleeve 98 permanently welded to the inner sleeve 95 and extending considerably below the inner sleeve and the lower nut 93. The lower extremity of the outer sleeve 98 contains a transverse through slot 99 through which the boom section 90 extends and is pivoted for vertical swinging movement on the swivel 91 by means of a sturdy pivot bolt 100.

Figure 13:
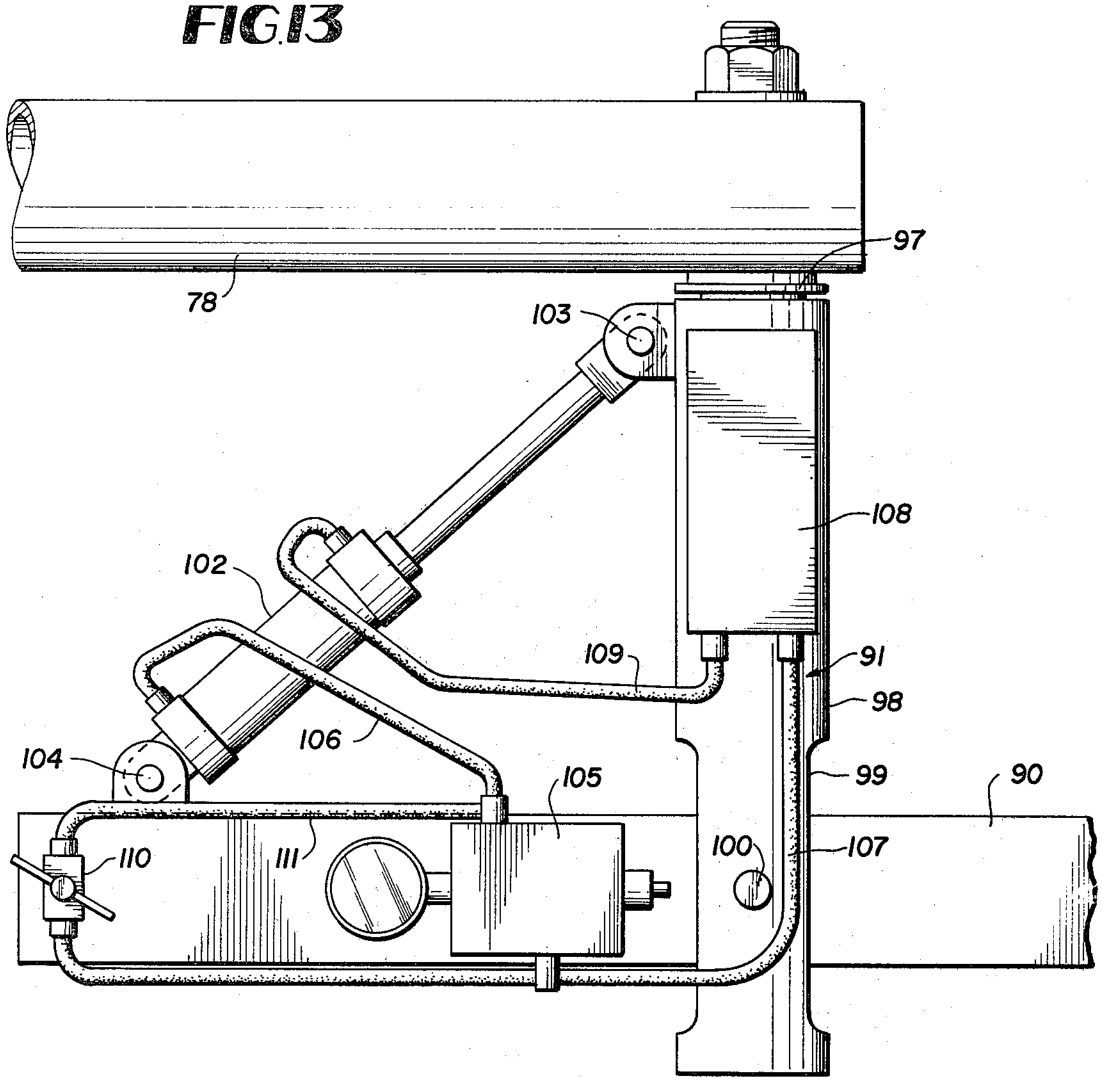
FIG. 13 is an enlarged fragmentary side elevation of an articulated boom safety relief system.

The counterweighting of boom sections 78 and 90 as disclosed in the referenced parent application has been eliminated in this invention to allow much greater ease of operation of the articulated boom by an operator who is utilizing a powered scissor press 101, FIG. 2, suspended from boom section 90 to apply nailing plates across the various joints of a truss. The trussed tower 63 and its bracing along with the very sturdy bearings 80 eliminates the need for counterweighting the boom section 78. In lieu of a counterweight on the boom section 90, a unique safety relief or retarder means is employed. With reference to FIGS. 13 through 15, this means comprises a retarder cylinder 102 coupled between the top of swivel 91 and the rear end of boom section 90, as at 103 and 104. A relief valve 105 mounted on one side of boom section 90, FIG. 13, is connected by a line 106 with the base of cylinder 102 and by another line 107 with a fluid holding tank 108 on the swivel 91. This tank is connected by another line 109 with the rod end of cylinder 102. The elevation of the tank 108 is above the top of cylinder 102 to enable a gravity feed for the system. An on-off valve 110 also on the boom section 90 is connected in parallel with the relief valve 105 by an extension 111 of the line 107 leading to the line 106 which goes to the base of the cylinder.

As the overall combined length of boom sections 78 and 90, FIG. 2, is 24 feet, a great deal of leverage and momentum is developed during the use of the boom requiring proper restraint without loss of mobility. In the present invention, the second boom section 90 can be held rigidly by means of cylinder 102 and this is the basis of the safety system in FIGS. 13 through 15. When the boom section 90 is level, the rod of cylinder 102 is extended. When the boom section 90 is lowered during use, FIG. 7, the cylinder rod must collapse or retract into the cylinder 102.

With the valve 110 open and boom section 90 held level, fluid from holding tank 108 flows through line 107 and through the valve 110, bypassing safety relief valve 105. This fluid enters the base of cylinder 102 and fills the cylinder bore below the piston. The valve 110 is closed, trapping fluid in the cylinder 102 making the cylinder unit rigid and locking boom section 90 in the horizontal position, as shown in FIGS. 2 and 13. The only way that fluid can leave the cylinder 102 without re-opening the valve 110 is to flow through the safety relief valve 105 in the direction of the arrow shown in FIG. 15. The valve 105 is a micro relief valve which is very sensitive to a small amount of weight on the boom section 90. With the scissor press 101 suspended from the boom section 90, the safety relief valve can be adjusted so that a relatively small downward pressure on the boom section 90 tending to lower it causes opening of the relief valve 105 enabling fluid to return to the holding tank 108 through the line 107. This operation allows the boom section 90 to be lowered slowly in a controlled and retarded manner without counterweighting. As has been described, all movements of the rather massive articulated boom are adjustably regulated for safety and for convenience of operation.

As shown in FIG. 2, the tower 63 also forms a support near its top for a pump 112 and motor 113 as well as other hydraulic and electrical components of the apparatus.

Figure 18:
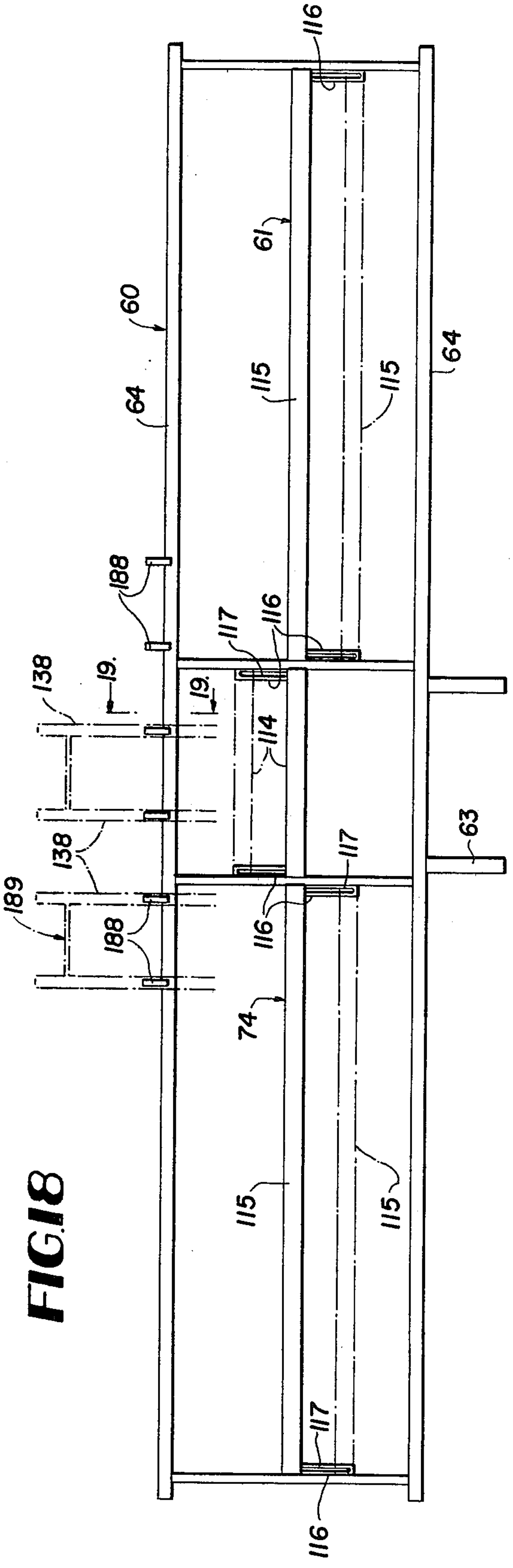
FIG. 18 is a partly schematic plan view showing the trailer bed, sectional laterally adjustable jig center rail and permanent mounts for a truss peak locator.
Figure 19:
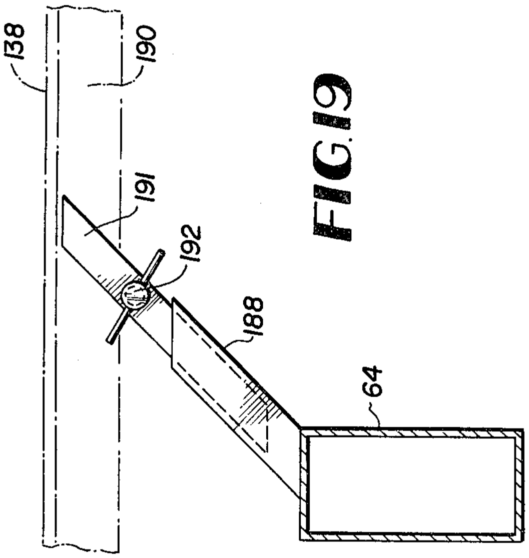
FIG. 19 is an enlarged fragmentary transverse vertical section taken on line 19—19 of FIG. 18.
Figure 20:
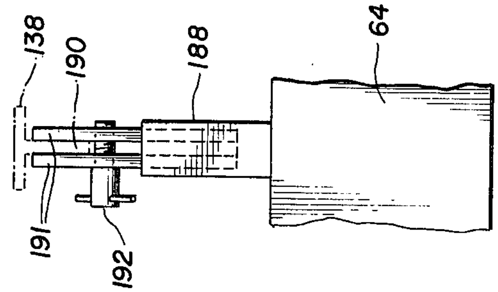
FIG. 20 is a fragmentary side elevation of the structure shown in FIG. 19.
Figure 21:
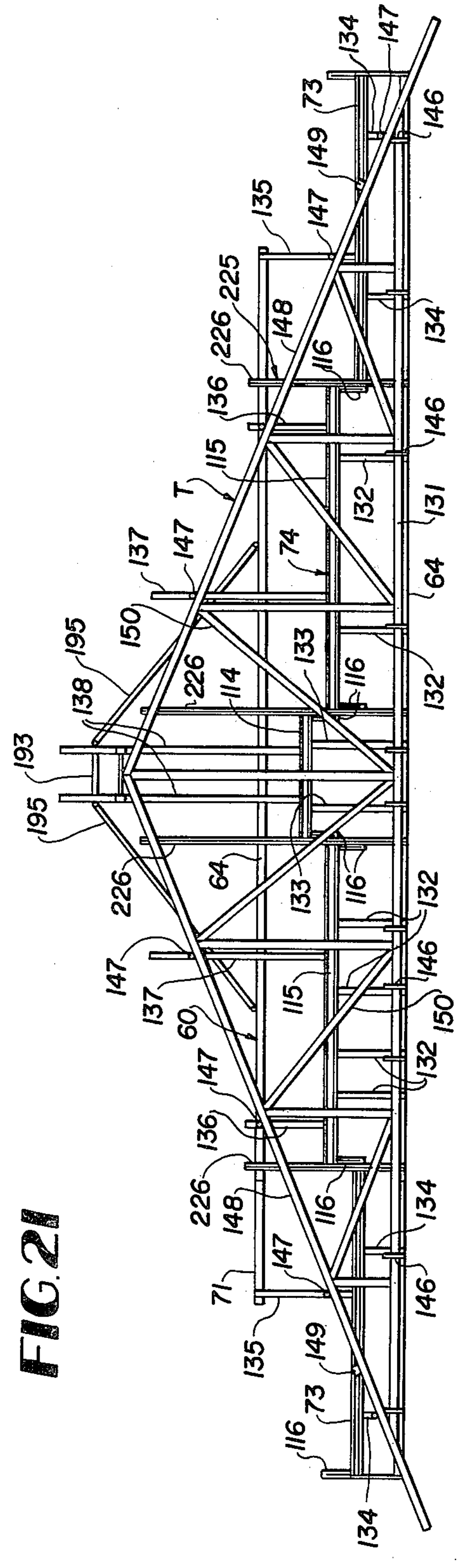
FIG. 21 is a plan view of the truss jig with truss lumber mounted thereon.
Figure 22:
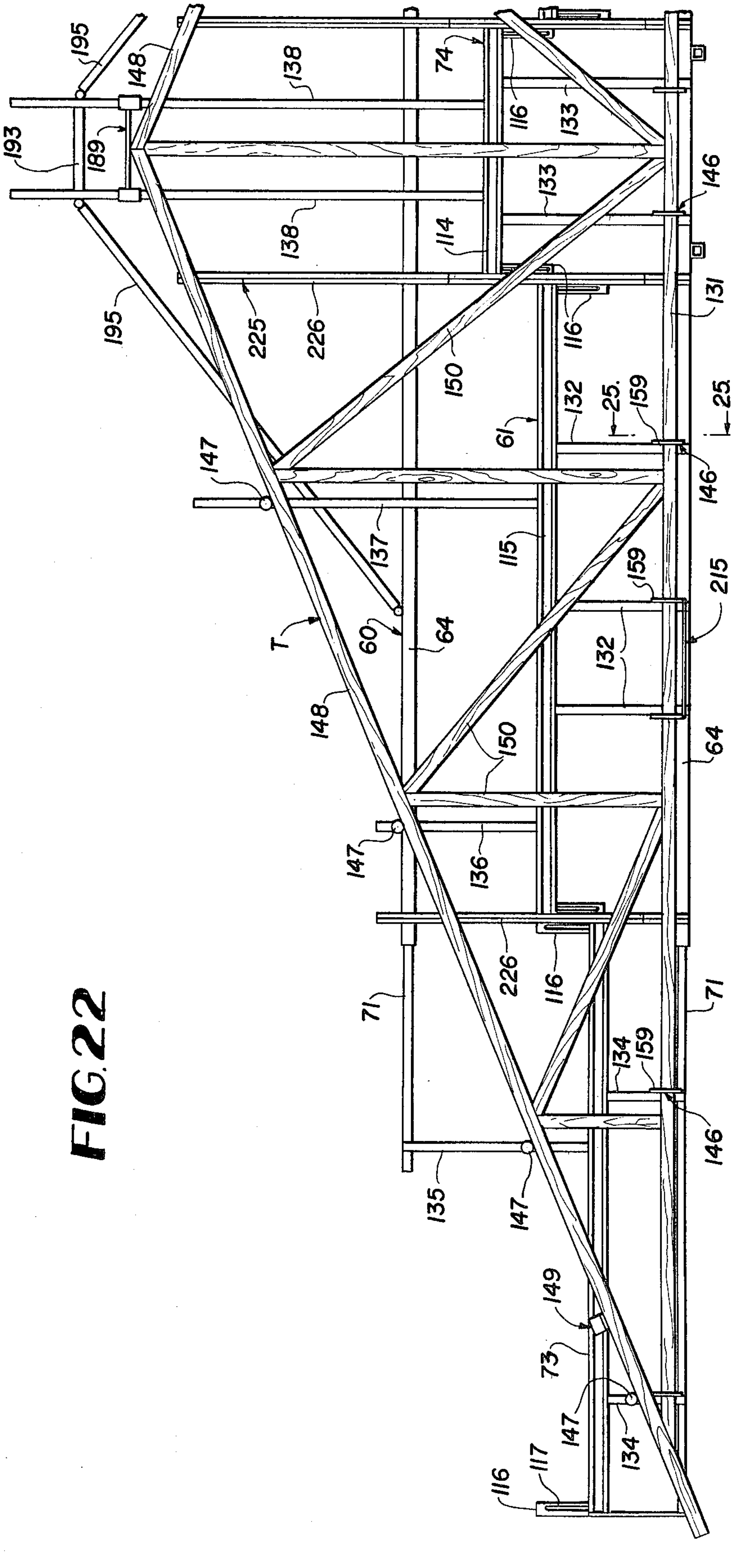
FIG. 22 is an enlarged fragmentary plan view showing one end portion of the truss jig and truss lumber thereon.

The previously-mentioned truss fabricating jig 61 forming a very important aspect of this invention comprises, as stated, the main longitudinal rail 74 which as depicted in FIG. 18 is formed in three sections namely a comparatively short mid section 114 and two equal length relatively long end sections 115. These rail sections are also shown in FIGS. 21 and 22. As indicated in FIG. 18, the rail sections 114 and 115 can be aligned at the center of the trailer bed 60, as during highway transport, and they may be offset laterally from the center line position as shown in phantom lines with the shorter mid section 114 disposed on one side of the center line, and the two longer rail sections 115 disposed on the other side of the center line.

Figure 4:
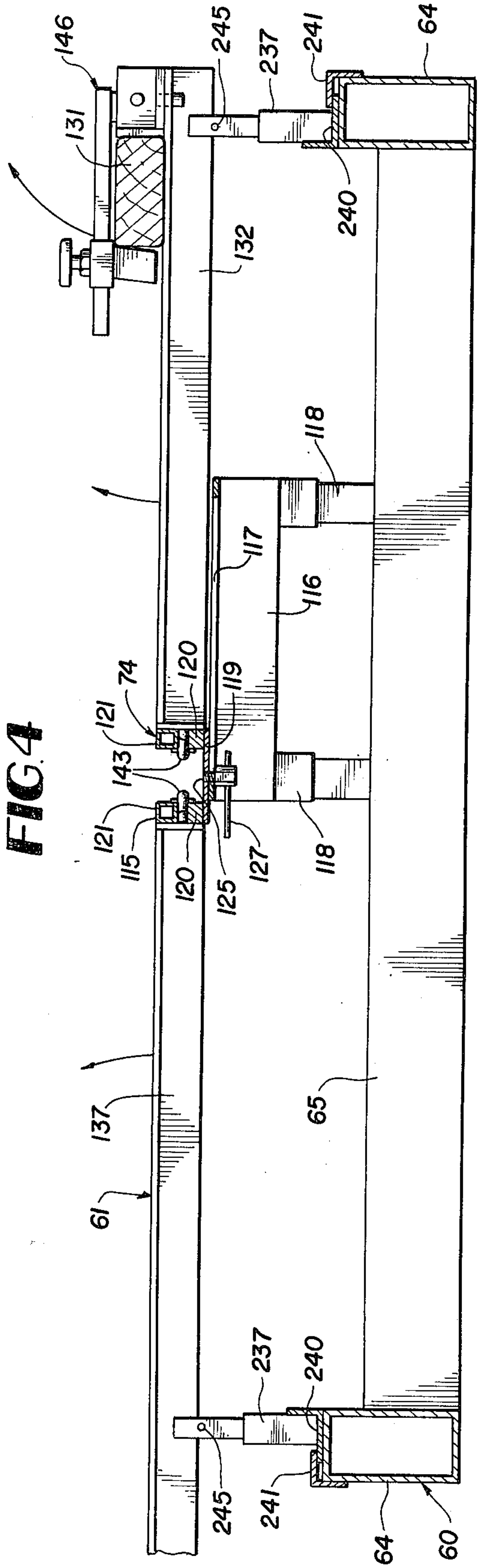
FIG. 4 is an enlarged fragmentary transverse vertical section through the bed and supported jig structure taken on line 4—4 of FIG. 2.
Figure 45:
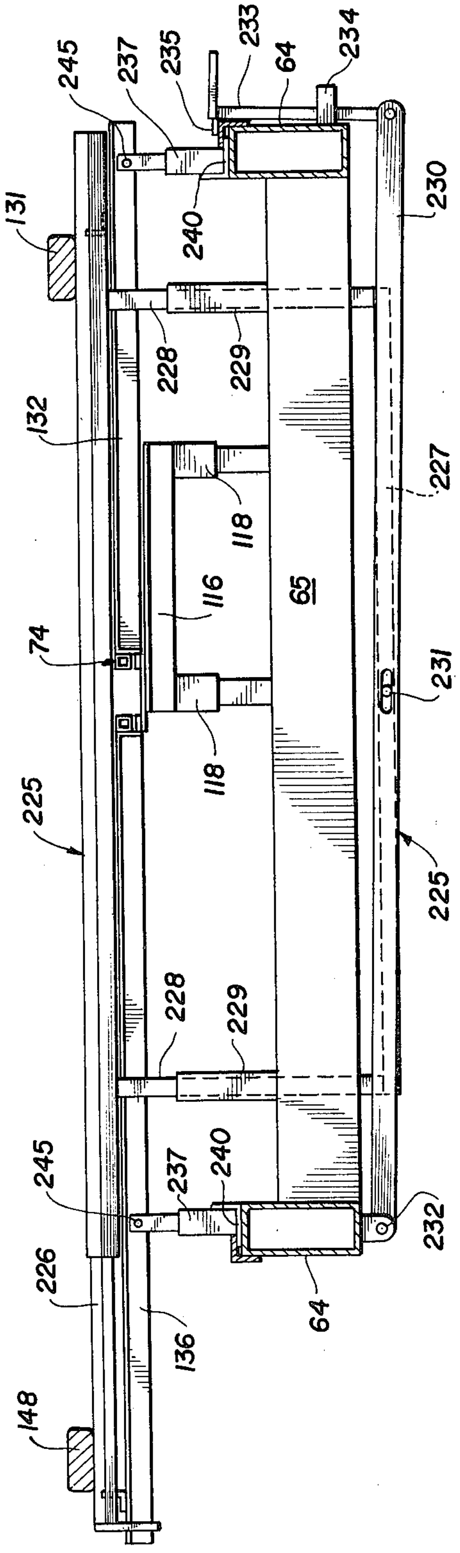
FIG. 45 is a similar view showing the reliever in an extended truss elevating position.

To support the center rail sections 114 and 115 for lateral adjustment, a system of lateral support and guide rails in the form of slotted angle bars 116 are arranged on the trailer bed 60, as shown in FIGS. 18, 21 and 22. These transversely extending slotted angle bars 116 are also shown in FIGS. 4 and 45. Each slotted angle bar 116 has a longitudinal slot 117 formed in its top web and extending at right angles to the longitudinal axis of the sectional main longitudinal rail 74 of the jig. Each slotted angle bar 116 is fixedly mounted on posts 118, in turn fixed to the cross braces 65 of trailer bed 60, FIG. 4. Since there are six of the slotted angle bars 116, FIG. 18, there are six pairs of support posts 118 for them on the trailer bed 60.

Figure 48:
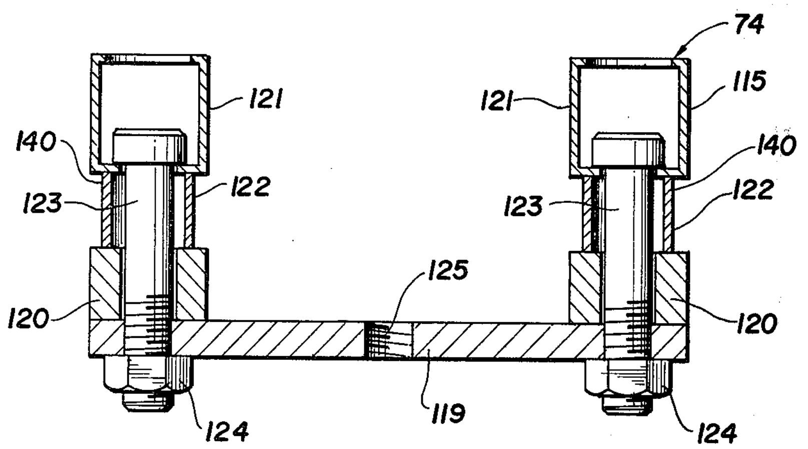
FIG. 48 is an enlarged fragmentary vertical section taken on line 48—48 of FIG. 5 showing the construction of the jig center rail.

FIG. 48 shows the cross sectional configuration of the main longitudinal jig rail 74 throughout its length. Each section of the main rail comprises a continuous base plate 119 upon which are mounted a pair of parallel continuous rectangular cross section bars 120 which extend along the edges of the base plate. Spaced above bars 120 in superposed parallel relation thereto are square cross section tubes 121 resting on a series of short upstanding cylindrical spacer sleeves 122 intervened with the tubes 121 and bars 120 at regularly spaced intervals along the main jig rail, FIG. 5. A corresponding number of cap screws 123 serve to lock the described elements of the main jig rail in assembled relationship, these cap screws carrying nuts 124 at their lower ends beneath the base plate 119.

In addition to supporting truss lumber and supporting a system of transverse jig arms, to be described, the channel-like main rail 74 can serve as a guide track for the wheel on the tongue of a mobile saw used to cut truss lumber on the job site when the saw is transported in piggy-back fashion to the job site by the present apparatus. The saw is not shown in the drawings.

At suitable points near their opposite ends, the laterally adjustable main jig rail sections 114 and 115 have threaded openings 125 formed in their base plates 119 for the reception of clamping screws 126 having operating handles 127. This allows for the quick lateral adjustment and relocation of main jig rail sections 114 and 115 as required to accommodate truss lumber for a particular size of truss undergoing fabrication, as shown in FIGS. 21 and 22. The headed clamping screws 126 are merely loosened to release the main rail sections for lateral adjustment along the slots 117 and are then tightened to lock the main rail sections in their selected adjusted positions. The top faces of the main rail sections 114 and 115 defined by the square tubes 121 lie in a common horizontal plane with other parts of the lumber jig, to be described.

Figure 6:
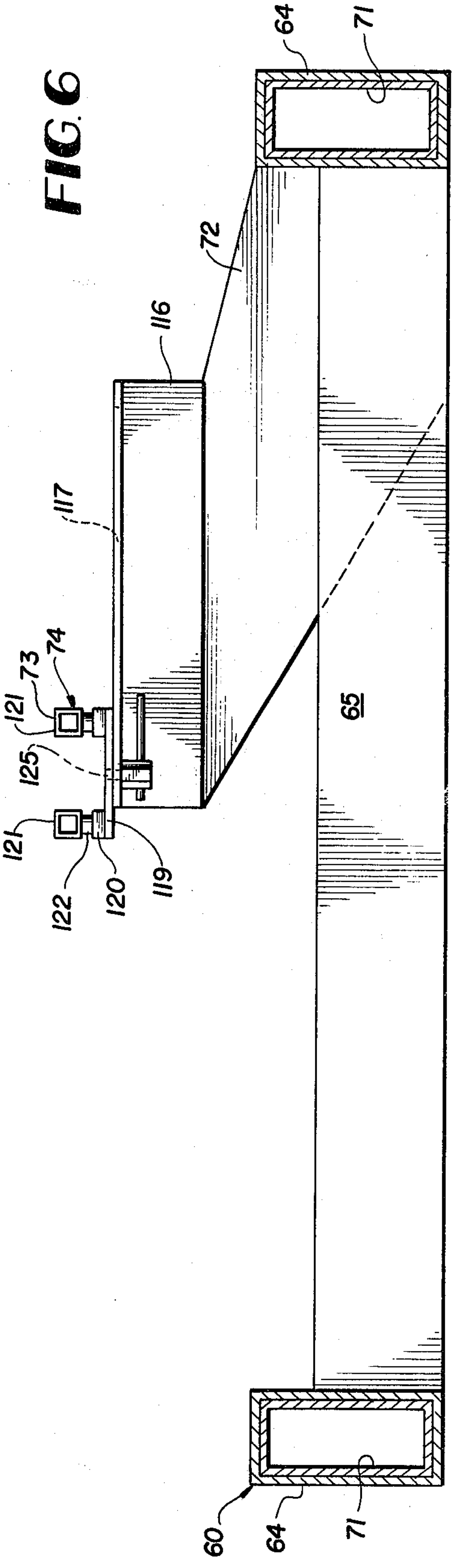
FIG. 6 is an enlarged fragmentary transverse vertical section taken on line 6—6 of FIG. 2.

In this latter connection, to facilitate construction of the large wooden trusses such as the truss T in FIGS. 21 and 22, the previously-mentioned main jig rail extensions 73 are employed. These extensions 73 are constructed in the same manner as the other rail sections 114 and 115, as described in connection with FIG. 48. As best shown in FIG. 6, the end portions of rail extensions 73 carry depending posts 129 which are supported in holders 130 on the described transverse support arms 72 of trailer bed side rail extensions 71. The inboard ends of main rail extensions 73 are attached to one of the supporting angle bars 116 of the trailer bed.

In addition to the sectional main center jig rail 74, the jig for the truss lumber as best shown in FIGS. 21 and 22 consists of a plurality of transverse horizontal jig arms of the required lengths extending outwardly from opposite sides of the several sections of the main jig rail 74. These several transverse jig arms have their top faces lying in common horizontal planes with the tops of the main rail sections 114 and 115 and the main rail extensions 73. The shorter horizontal transverse jig arms extending from main rail sections 115 toward the main bottom chord 131 are indicated at 132 in the drawings. Somewhat longer transverse jig arms 133 extend from the same side of main rail section 114 toward the truss chord 131, and somewhat shorter arms 134 extend from the main rail extensions 73 transversely toward the truss chord 131. All of the jig arms above noted mutually support the chord 131 in a level plane.

On the opposite side of the main jig rail 74 similar horizontal transverse jig arms 135 extend from the main rail extensions 73 and similar arms 136 and 137 of unequal lengths extend transversely outwardly from the rail sections 115 to lend additional support in a common horizontal plane for the truss lumber. Two more jig arms 138 of greater length similarly extend outwardly from the intermediate main jig rail section 114.

Each of the described transverse horizontal jig arms projecting from the sectional main center longitudinal rail 74 is in the form of a T-cross section bar as indicated in the drawings and thus the several transverse jig arms have a common construction.

Another important feature of the invention is a simplified, reliable and positive means for releasably locking the several transverse jig arms above described releasably and adjustably to the main longitudinal jig rail 74, thus adding to the flexibility of use of the jig. This means is depicted in detail in FIGS. 46 and 47 in relation to jig T-bar arms 136, and the arm securing arrangement is the same for all of the described transverse jig arms shown in FIGS. 21 and 22.

Figure 5:
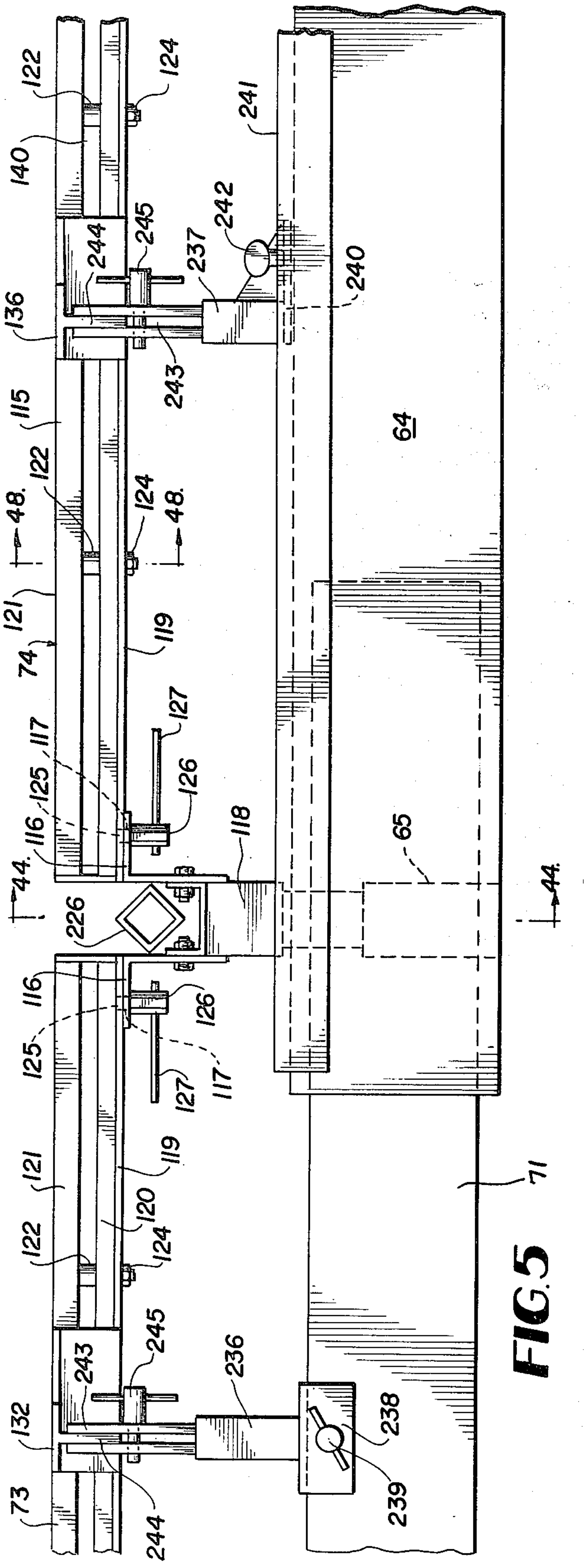
FIG. 5 is an enlarged fragmentary side elevation of the apparatus in FIG. 2.
Figure 46:
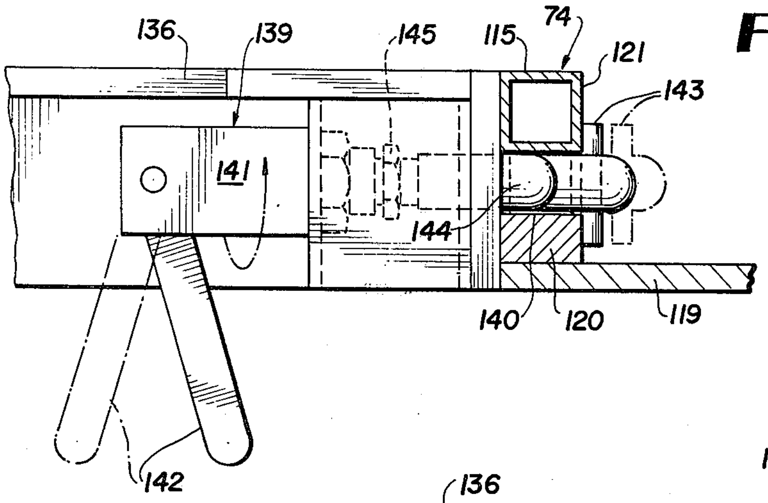
FIG. 46 is a fragmentary vertical section taken through the center rail of the jig adjacent to the plane of a quick release toggle clamp used to releasably attach transverse jig T-bars to the jig center rail, the clamp being shown in an active position.
Figure 47:
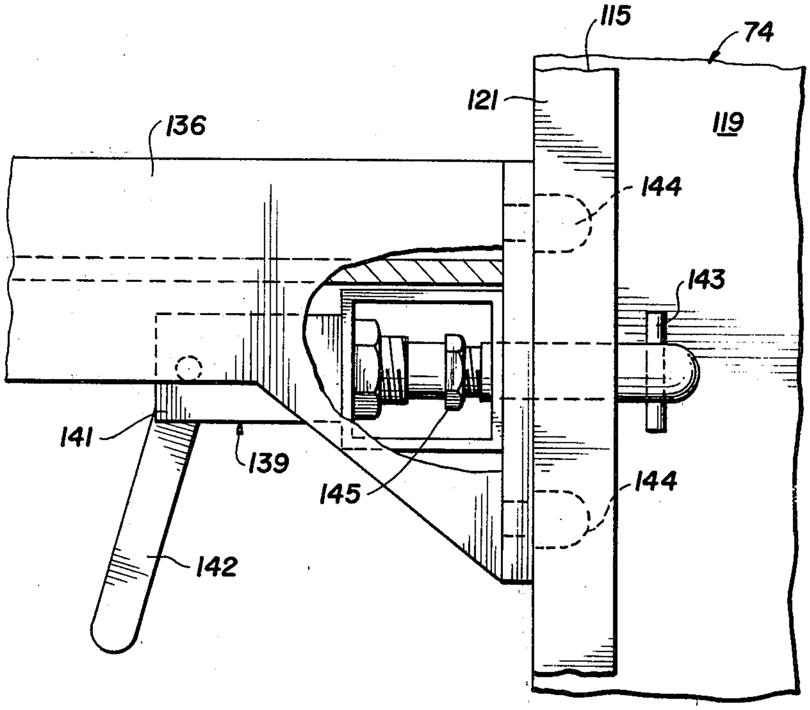
FIG. 47 is a fragmentary plan view of the structure in FIG. 46, partly broken away, and showing the toggle clamp in a release position.

A swiveling type toggle clamp 139 is employed to connect each jig arm to the main rail 74, taking advantage of the substantially continuous slot 140, FIG. 5, in the main rail 74 existing between the spacers 122. The clamp 139 is designated Model No. 604, manufactured and sold by DE-STA-CO, a division of Dover Corp., 350 Midland Ave., Detroit, Mich. 48203. The clamp includes a body portion 141 containing a toggle linkage, not shown, which can be activated by a pivoted handle 142. A forward T-locking head 143 of the clamp responds to movement of the handle 142 as shown in FIG. 46 to pull the T-locking head into firm clamping engagement with the interior side faces of tube 121 and bar 120. Prior to such locking, the head 143 is placed through the slot 140 in either side of the main rail 74 with the cross pin of the locking head rotated to be parallel with the slot, as shown in FIG. 47. To facilitate proper engagement of the jig arm with the main rail 47, each jig arm is equipped with a pair of spaced locator lugs 144 which can guidingly enter the main rail slot 140 and remain therein when the clamp 139 is activated so that no twisting of the jig arm 136 can occur, and its top lumber support base is held level. Once the locking head 143 is through the slot 140, FIG. 47, and the lugs 144 have entered the slot, the clamp body 141 can be rotated or swiveled, as shown by the directional arrow in FIG. 46. This places the cross pin of head 143 across the rail slot 140, as shown in phantom lines in FIG. 46. Following this, the locking handle 142 is thrust forwardly to the full line position in FIG. 46 and the internal toggle mechanism pulls the head 143 into tight clamping engagement with the elements 121 and 120 of main jig rail 74. The clamp includes a jam nut 145 which prevents rotation or unscrewing of the T-locking head 143. The arrangement is most efficient and enables the several jig arms to be quickly installed or located at any necessary points along the sectional main longitudinal rail 74, as illustrated in FIGS. 21 and 22. The clamp 139 is positive, quick-acting, and very reliable as well as highly convenient. The arrangement of the locking head 143 for jig arms 132 and 137 can be seen in FIG. 4 which is typical of the arrangement for all arms of the jig.

The truss fabricating jig includes a system of stops which are critical in adjusting or setting up the jig to accept and position the necessary cut lumber for making a particular size and shape of truss. The system of stops together with other described features of the jig enables the jig to be completely set up to accept the truss lumber even before the lumber is cut in contrast to the prior art. Referring to FIGS. 21 and 22, a series of permanent stops 146 at strategic locations along the lower main chord 131 of the truss are employed and another series of readily removable and relocatable swivel stops 147 are employed to locate the converging upper members 148 of the truss which define the pitch of the roof. The several permanent stops and swivel stops, as shown in FIGS. 21 and 22, establish the perimeter of each truss undergoing fabrication, as will be further described. A pair of center rail stops 149 are also involved in the jig. It should be noted that, in some instances, the swivel stops 147 can be used to properly locate the web members 150 of the truss although such usage is not shown in FIGS. 21 and 22.

Figure 37:
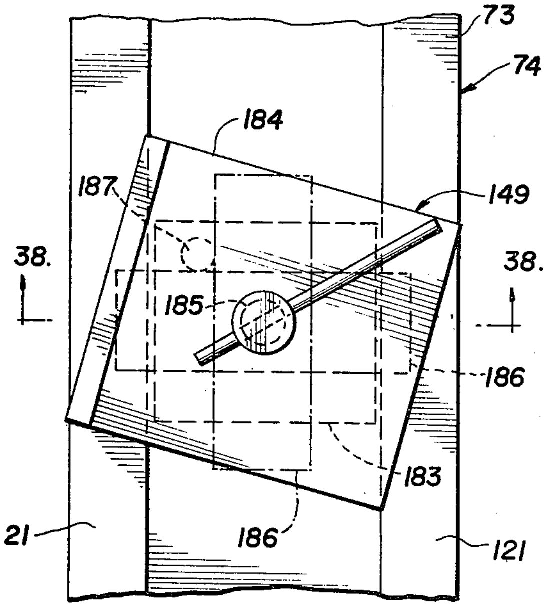
FIG. 37 is a fragmentary plan view showing a center rail stop.
Figure 38:
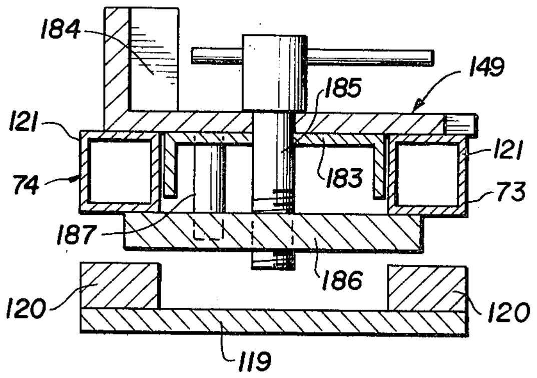
FIG. 38 is a fragmentary vertical section taken on line 38—38 of FIG. 37.
Figure 25:
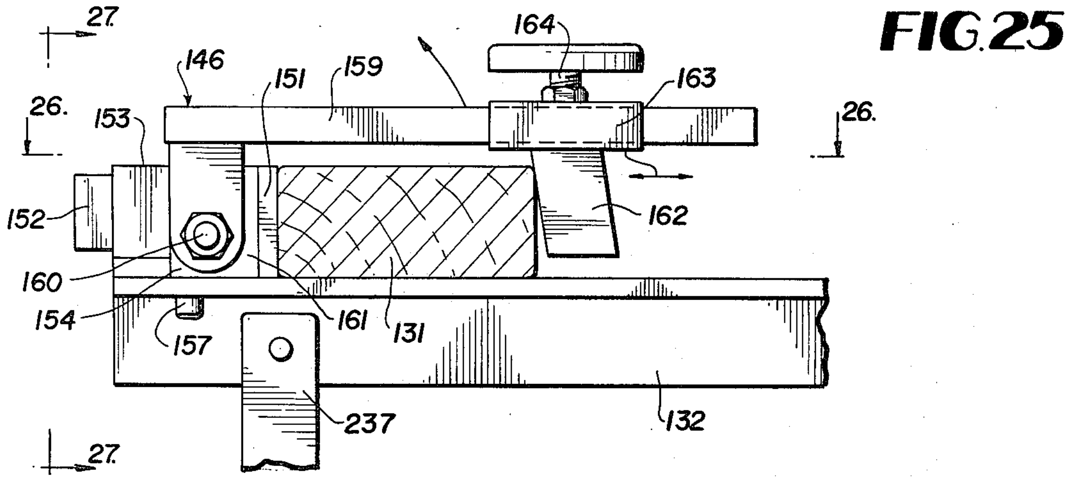
FIG. 25 is an enlarged fragmentary vertical section taken on line 25—25 of FIG. 22 and showing a permanent stop device.
Figure 26:
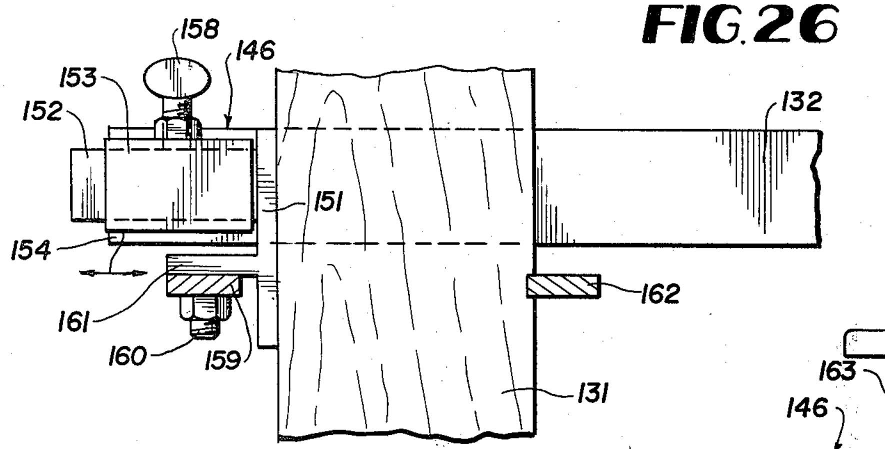
FIG. 26 is a fragmentary horizontal section taken on line 26—26 of FIG. 25.
Figure 27:
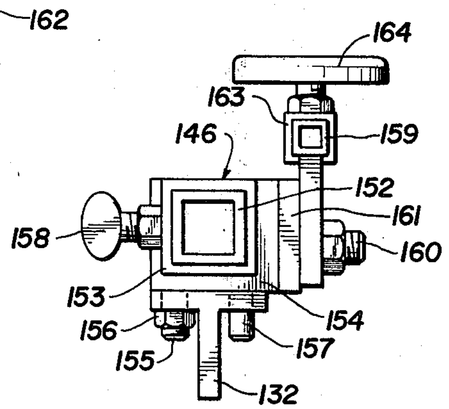
FIG. 27 is an end elevational view of the structure shown in FIG. 25 looking in the direction of the arrows on line 27—27 of FIG. 25.
Figure 28:
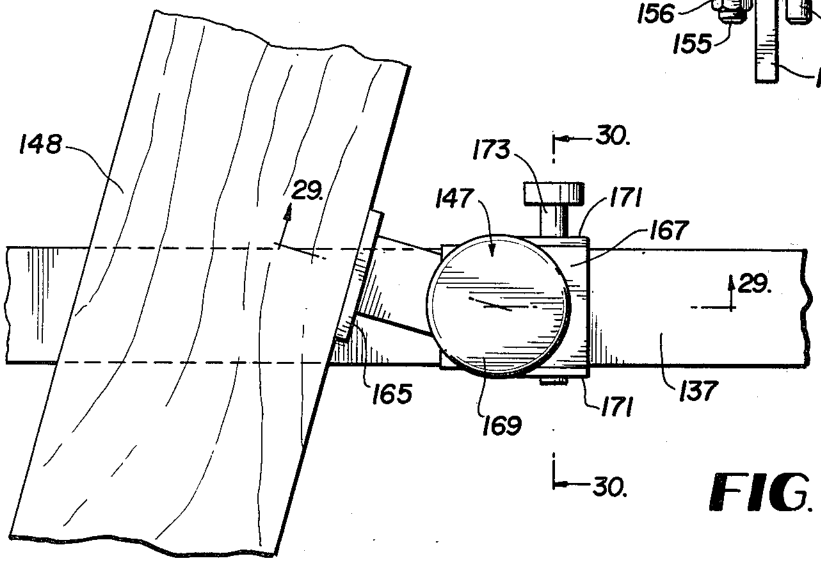
FIG. 28 is a fragmentary plan view of a swivel stop and associated elements.

Details of each permanent stop 146 are shown in FIGS. 25 through 27. Like details of the swivel stops 147 according to one embodiment thereof are shown in FIGS. 28 through 32 and details of the center rail stops 149 are shown in FIGS. 37 and 38. A second and preferred embodiment of the swivel stop is shown in FIGS. 33 through 36 and this swivel stop can be used in lieu of the one illustrated in FIGS. 28 through 32.

Referring to FIGS. 25 through 27, each permanent stop 146 includes a stop or locator plate 151 for abutment with the exterior edge of the truss bottom chord 131. This plate 151 is rigidly attached to an interior square tube 152 engaging telescopically through an exterior tube 153, the latter being fixed to a base member 154 which is attached rigidly to the top web of the adjacent T-bar jig transverse arm, namely the arm 132 in FIGS. 25 through 27. This attachment is effected through one threaded stud 155 on the base member 154, carrying a nut 156, and one locator pin 157 which serves to maintain the permanent stop properly aligned with the plate 151 at right angles to the axis of the T-bar arm 132.

Each permanent stop plate 151 is adjustable up to one inch across the axis of the chord 131 and is lockable in the selected adjusted position by a side set screw 158. The set screw bears on the interior tube 152 to lock it relative to the outer tube 153 and attached base 154. This important adjustment in each permanent stop 146 enables the establishment with the jig of the proper degree of camber in the truss bottom chord 131, such as 1/60th of an inch per linear foot of the bottom chord.

Each permanent stop further comprises a flip over arm 159 pivotally connected as at 160 to an ear 161 of the stop plate 151. Therefore, the flip over arm 159 is bodily attached to the permanent stop plate 151 and moves therewith whenever the stop plate is adjusted for cambering. The flip over arm 159 carries an adjustable wedge plate 162 which wedgingly engages the interior longitudinal edge of the cord 131 forcing the latter firmly against the plate 151 of the permanent stop. The wedge plate 162 depends from a sleeve 163 which telescopes over the arm 159 and is adjustable thereon longitudinally. The sleeve 163 and wedge plate are securely locked in the selected adjusted position by a clamping set screw 164 having a convenient turning knob.

Figure 29:
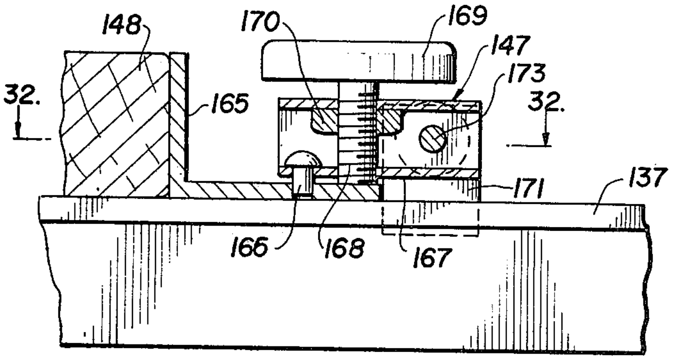
FIG. 29 is an enlarged fragmentary vertical section taken on line 29—29 of FIG. 28.
Figure 30:
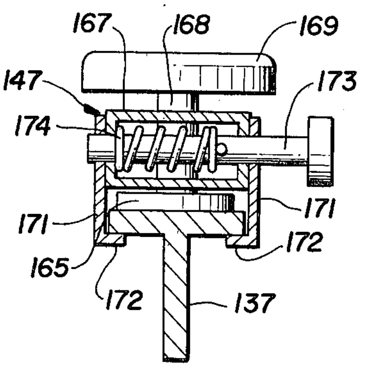
FIG. 30 is a fragmentary vertical section taken on line 30—30 of FIG. 28 and showing a keeper for a swivel stop engaged with a supporting T-bar.
Figure 32:
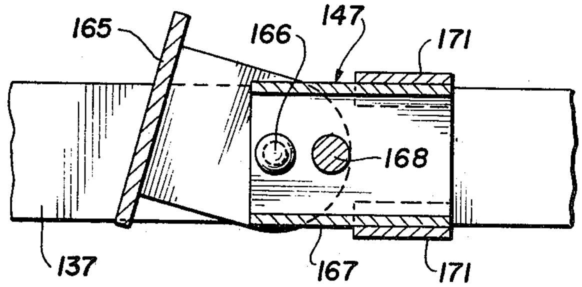
FIG. 32 is a fragmentary horizontal section taken on line 32—32 of FIG. 29.
Figure 31:
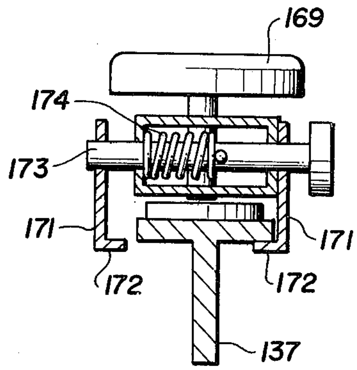
FIG. 31 is a view similar to FIG. 30 showing the swivel stop keeper disengaged from the T-bar.

Each previously-mentioned swivel stop 147, FIGS. 28 through 32, is releasably and adjustably attached to a T-bar jig arm projecting toward the top of the truss in FIGS. 21 and 22, namely one of the arms 137 in the drawing illustration. A pivoted stop member 165 of L formation, FIG. 29, is adapted to engage the outer longitudinal edge of one of the converging truss members 148 to position it properly in a given truss while resting on several transverse arms of the jig. The stop member 165 is pivoted by a pin 166 to a hollow body member 167 which carries an upright clamping screw 168 having a large turning knob 169. The screw 168 is threaded through a nut 170 contained in the hollow body member 167, the latter being rectangular in cross section. Keepers 171 on opposite sides of body member 167 are adapted to have their flanges 172 engage beneath the top web of the associated jig arm 137, FIG. 30. One keeper 171 is fixed to one side of the body member 167 while the opposing keeper is fixed near the end of a keeper release pin 173 which extends through aligned apertures in the side walls of member 167 and in the stationary keeper 171. The opposing keeper 171 moves with the pin 173, FIG. 31, which is biased by a compression spring 174 to the position shown in FIG. 30 where both keepers 171 are engaged with the T-bar arm 137. To remove the swivel stop 147 from the arm 137 or to adjust the swivel stop along the arm, it is merely necessary to push the pin 173 in the direction to compress the spring 174 and move the pin attached keeper 171 toward the release position shown in FIG. 31.

When each swivel stop 147 is thus positioned on a jig arm in the described manner, the pivoted stop member 165 can be swung to the desired angular position about the axis of the pin 166, and by a simple one time tightening of the set screw 168, both the element 165 and the entire stop assembly are securely locked in selected adjusted positions. The single tightening down of the screw 168 forces the base of stop member 165 against the top of arm 137 and simultaneously elevates the keeper flanges 172 against the lower face of the top web of T-bar arm 137. The operation of the swivel stop 147 is quick and convenient and saves much time in jigging up for the fabrication of a truss.

In lieu of swivel stop 147, a second and preferred embodiment of the swivel stop designated 147′ in FIGS. 33 through 36 is provided. The preferred swivel stop 147′ is used for the same purpose as the previously described stop 147. The swivel stop 147′ comprises an angle base 175 having an upright abutment plate 176 to engage the truss lumber 148, as shown in FIG. 33. A cross head 177 has two depending headed lock pins 178 fixed thereon in straddling relationship to the T-bar arm 137. The cross head is pivoted to the angle base 175 by a pivot stud 179 welded in an opening of the angle base in an off-center position on the cross head. A clamping screw 180 threaded into an opening 181 at the center of the cross head 177 bears upon the top of angle base 75 when tightened down to lock the angle base in the selected angular position and to simultaneously lock the swivel stop assembly on the T-bar arm 137 in any selected position along this arm. Prior to tightening the set screw 180, the assembly is shifted to the desired position on the arm 137 and the cross head is rotated on the pivot stud 179 in either direction to cause the headed lock pins 178 to move beneath the top flange 182 of the arm 137, as depicted in FIG. 33. At this point, tightening of the screw 180 will simultaneously pull the heads of the two locking pins up against the bottom of web 182 and force the angle base 175 down tightly against the top face of arm 137 in any chosen angular position. The arrangement is very simple and positive as well as convenient. With the cross head 177 in the neutral position, FIG. 34, across the arm 137, the locking pins 178 are outwardly of the side edges of the arm and the assembly can be lifted off of the arm.

As stated, the system of jig stops includes the two center rail stops 149, the details of which are shown in FIGS. 37 and 38. The placement of these two stops on the jig is shown in FIGS. 21 and 22 for the particular large truss T undergoing fabrication, and requiring the use of main jig rail extensions 73. In other cases, for smaller trusses, the center rail stops may be mounted in the center rail sections 115 if their usage is required.

Each stop 149 consists of an inverted channel base 183 which enters between the upper square tubes 121 of the main jig rail. An angle head or stop 184 adapted to abut the exterior of a truss member 148, FIG. 22, can rotate 360 degrees around the axis of a central clamping screw 185 having a turning handle. This screw passes through an aperture in the base 183 which is prevented from rotating by the tubes 121 and is threaded into an elongated nut 186 which lies below the elevation of the tubes 121. A depending stop pin 187 in the path of rotation of this nut is fixed to the base 183 near one corner thereof, FIG. 37.

When the clamping screw 185 is loosened by counterclockwise turning, the nut 186 will turn with it until it strikes stop pin 187 with the long nut parallel to the main rail tubes 121 and centered between them, FIG. 37. At this time, the entire stop 149 can be lifted from the rail 174, if desired. When the screw 185 is rotated clockwise for tightening, the nut 186 will rotate with it 90 degrees until it again strikes stop pin 187, at which point the long nut is across the main rail 74 and under the tubes 121. With the angle head 184 properly positioned to engage the truss member, the screw 185 is firmly tightened to simultaneously draw the nut 186 up against the bottoms of tubes 121 and push the angle head 184 down on the tubes. The construction of the stop is simple and its use is convenient and quick.

In addition to the described system of precision stops, the truss fabricating jig 61 further comprises a truss peak locator arrangement shown particularly in FIGS. 18–20, 23, 24 and 41. As best shown in FIG. 18, a series of paired longitudinally spaced laterally inclined tubular holders 188 for the peak finder support arms 138 are permanently attached by welding to the trailer side rail 64 away from boom tower 63. By having several pairs of the holders 188, as illustrated, the truss peak locator 189, FIG. 41, can assume several different positions along the apparatus which greatly increases the versatility of the apparatus in terms of fabricating a wider range of truss shapes and sizes, placing the truss lumber in the most advantageous position for applying nailing plates to the various joints by means of the powerful scissor clamp or press 101.

A selected pair of the holders 188 receives the parallel transverse horizontal T-bar support arms 138 with the vertical webs 190 of the latter engaging between spaced extension plates 191 of holders 188, the extension plates being welded in the permanent holders 188. Clamping screws 192 on the paired extension plates 191, when tightened, enable these plates to tightly grip the webs 190 for securing and supporting the arms 138 intermediate their ends.

Figure 24:
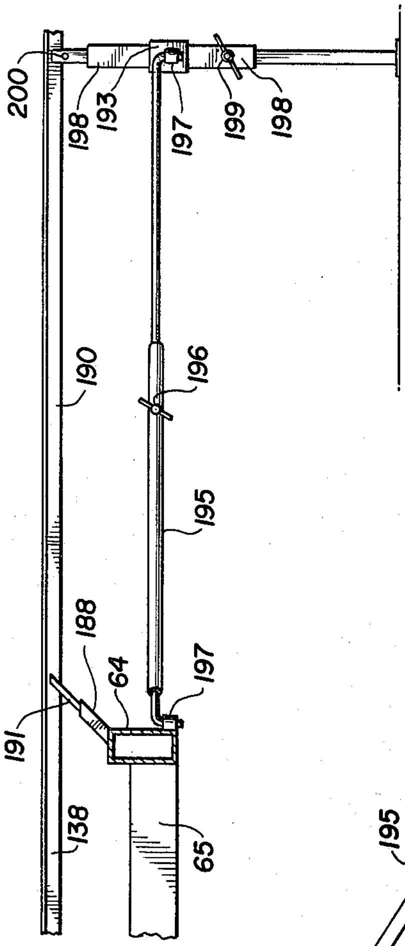
FIG. 24 is a fragmentary side elevation of the structure in FIG. 23.
Figure 23:
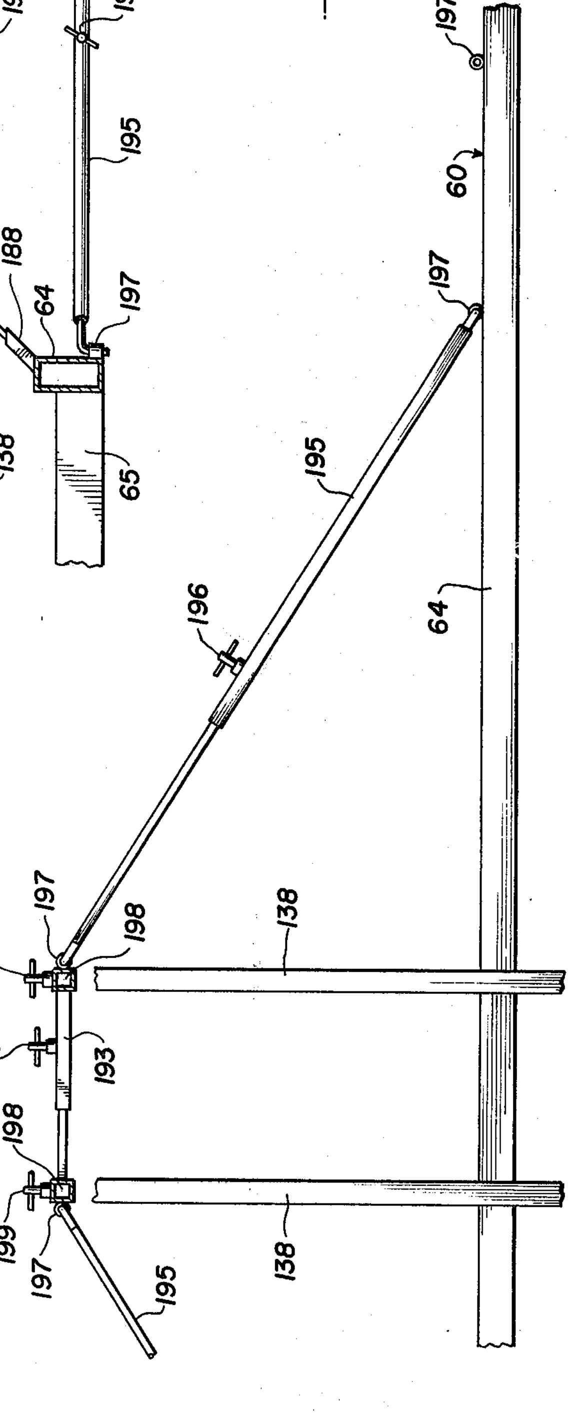
FIG. 23 is a fragmentary plan view of a support and stabilizer for a truss peak locator.

As the arms 138 are quite long, FIGS. 21 and 22, it is desirable to support and stabilize them near their outer ends by the means shown particularly in FIGS. 23 and 24. This means comprises a telescopically adjustable longitudinal brace 193 near the outer ends of arms 138 and outwardly of the truss peak, FIG. 21. A clamping set screw 194 is provided on the brace 193 to lock it in the adjusted position. A pair of telescopically adjustable diagonal braces 195 having locking set screws 196 interconnect the opposite ends of the longitudinal brace 193 with the adjacent side rail 64 of trailer bed 60. The opposite ends of each adjustable brace 195 have lateral terminals received detachably in eyes 197 on the side rail 64 and brace 193, respectively.

The peak finder support and stabilizing means further comprises a pair of telescopically adjustable drop legs 198 having locking set screws 199 and being pivotally attached as at 200 to the peak locator support arms 138, FIG. 24. A very stable support arrangement for the arms 138 is thus provided so that the rather critical peak locator 189 is firmly supported in all planes.

Figure 41:
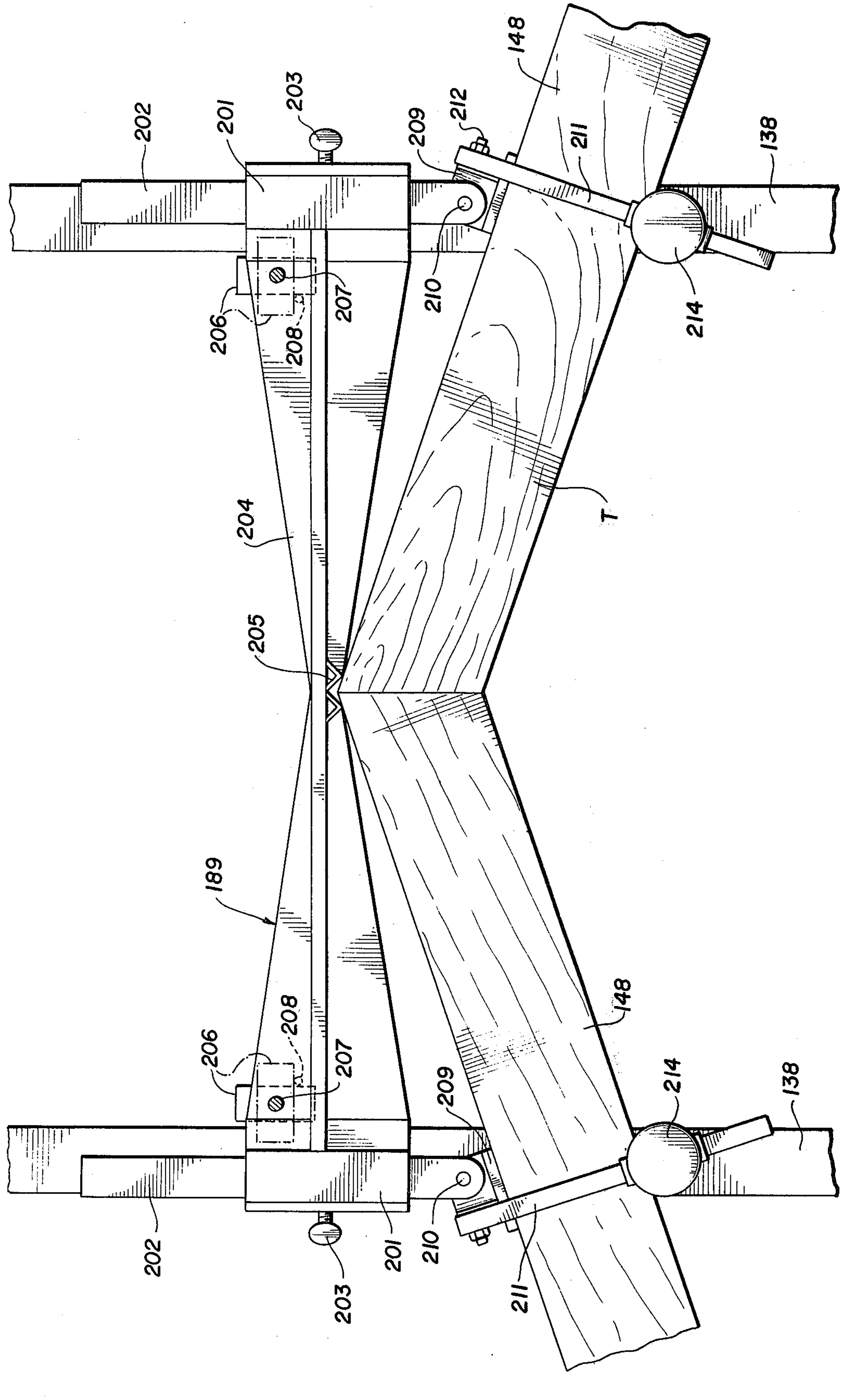
FIG. 41 is a fragmentary plan view of a truss peak locator and associated parts.

Referring now to FIGS. 41, 42 and 43, the peak locator 189 comprises a pair of parallel sleeves 201 receiving therethrough adjustably slotted arms 202 adapted to be releasably locked relative to the sleeves 201 by pointed set screws 203 as best shown in FIG. 43. The peak locator body portion 204 rigidly coupled between the sleeves 201 is of inverted T cross section and has a peak locator gage element 205 provided thereon at its longitudinal center, FIG. 41, to precisely locate the peak of each truss T undergoing fabrication.

The peak locator 189 is bodily attached to the two T-bar arms 138 by a device, FIG. 43, substantially identical to the previously-described center rail stop 149, FIGS. 37 and 38. The similar device shown in FIG. 43 includes a long nut 206 carried by a clamping screw 207 which can rotate between the two right angular positions shown in full and broken lines in FIG. 41. A stop pin 208 depending from the peak locator body portion 204 positively limits rotation of the nut 206 exactly as described relative to the nut 186 of center rail stop 149. With the nut 206 in the broken line position, FIG. 41, and engaging stop pin 208, the nut will lie beneath the top web of arm 138 and by tightening the clamp screw 207, the peak locator 189 is securely locked to the two arms 138 in the selected adjusted position. The adjustability of the sleeves 201 relative to slotted arms 202 is entirely independent of the attaching devices having the nuts 206.

The interior ends of arms 202 have swivel heads 209 pivoted thereto at 210, FIG. 41. These two swivel heads 209 engage the outer edges of the truss lumber sections 148 at proper angles. The adjustments of the slotted arms 202 within the sleeves 201 establishes the proper pitch of the members 148 leading up to the truss peak which is located by the gage element 205. A pair of flip-over arms 211 substantially identical to the described arms 159 of permanent stops 146, FIG. 25, are pivoted at 212 to the swivel heads 209. The flip-over arms 211 carry depending wedge plates 213 having adjusting clamp screws 214 for the same purpose described relative to the wedge plate 162 of permanent stop 146.

The flip-over arms 211 extend across truss peak members 148 at right angles thereto, and the wedge plates 213 engage the inner longitudinal edges of members 148 to lock them firmly with swivel heads 209 and the peak locator assembly.

Figure 39:
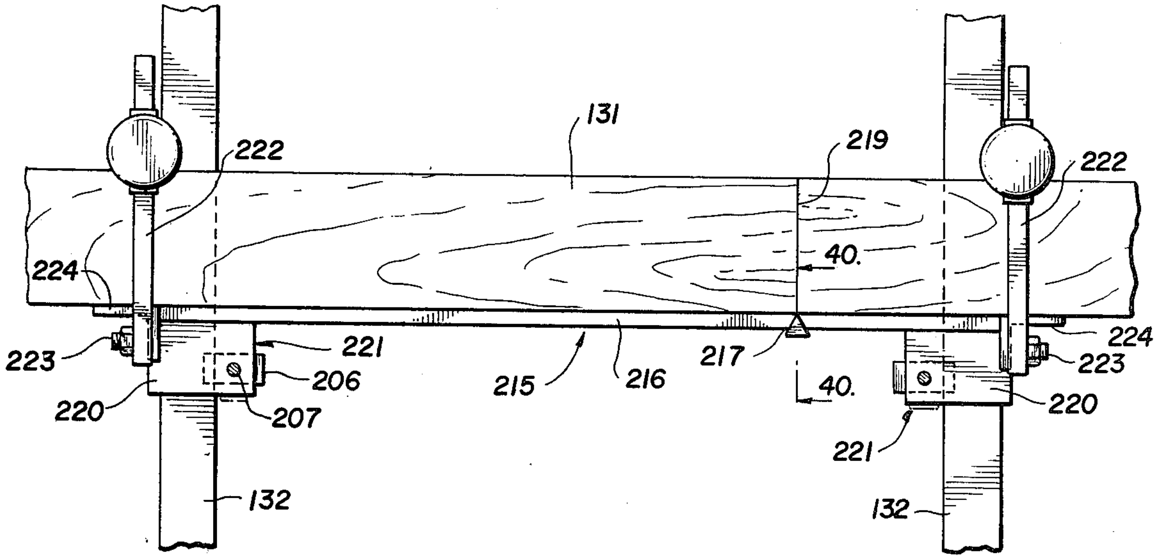
FIG. 39 is a fragmentary plan view of a splice locator and associated parts.

Another feature of the invention contributing to the precision and symmetry and the uniformity of each truss is the provision in the jig 61 of a bottom chord splice locator 215, FIGS. 22, 39 and 40. It is desirable that the bottom chord splice be located at the same point for each truss manufactured in accordance with the invention, and the truss locator achieves this purpose.

The splice locator 215 consists of a small channel bar 216 for abutment with the outer longitudinal edge of truss main chord 131, as shown. A pointer element 217 is adjustably secured to the channel bar 216 by clamping set screw 218, FIG. 40. The bottom chord splice 219, FIG. 39, can be consistently located at the same point along the bottom chord 131 by use of the locator 215.

The ends of the splice locator bar 216 are attached to mounting brackets 220 which are seated on the adjacent transverse T-bar jig arms 132. These mounting brackets are releasably secured to the arms 132 by pivotal long nut devices 221 of the same type shown in FIG. 43 for the attachment of peak locator 189, and also shown in FIGS. 37 and 38 relating to the center rail stop 149. This is a convenient and reliable quick-release clamp. As in FIG. 43, the long nuts of devices 221 are adapted to engage under the top webs of T-bar arms 132. The splice locator 215 further embodies a pair of the previously-described flip-over arms 222 pivoted at 223 to brackets 220 and being equipped with wedge plates of the same type indicated at 213 in FIG. 42 and at 162 in FIG. 25. The description of the wedge plates need not be repeated, and their purpose is the same, namely, for engaging the interior edge of truss bottom chord 131 and wedging the outer edge thereof firmly against abutment elements 224 of brackets 220, as well as the channel bar 216. In essence, the splice locator 215 is a convenient adjustable gage mountable upon a pair of the jig transverse T-bar arms so that the truss bottom chord can be consistently located.

Still another important feature of the invention shown primarily in FIGS. 5, 45, 21 and 22 is a truss reliever or lifter 225, by means of which each completed truss can be raised slightly, FIG. 45, from the supporting jig structure for easy transfer by sliding to the ground or to another appropriate support.

The truss reliever consists of preferably four square cross section transverse lifting arms 226 disposed in the open spaces between the back-to-back pairs of slotted rails 116 on which the sections 114 and 115 of the main longitudinal jig rail 74 are mounted. This arrangement of the truss reliever lifting arms 226 is compact and space saving, as best shown in FIG. 5. As shown in FIGS. 21 and 22 and also in FIGS. 44 and 45, the truss reliever arms 226 progressively increase in length from the ends of the apparatus toward its center adjacent to the peak of the truss. Thus, the truss reliever arms extend transversely from support points beneath the bottom chord 131 of the truss toward and under the pitched members 148 of the truss to thereby support the entire truss T in four critical areas for raising the truss at proper times from the support plane of the jig.

Figure 44:
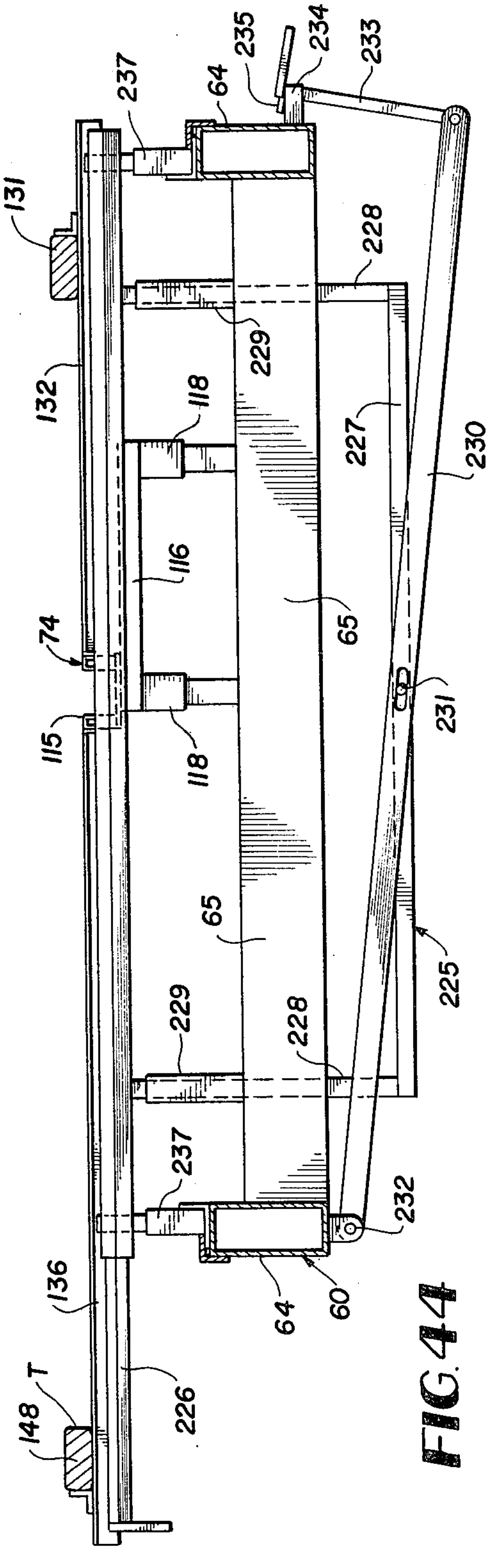
FIG. 44 is a transverse vertical section taken substantially on line 44—44 of FIG. 5 and showing a truss reliever in a retracted position.

As depicted in FIGS. 44 and 45, the truss reliever arms 226 which extend across the main rail 74 of the jig in the passages between slotted rails 116. Each truss reliever arm is bodily carried by a raising and lowering frame 227 having vertical arms 228 guided by vertical sleeves 229 fixed to each adjacent cross brace 65 of the trailer bed 60. A lifter link 230 for the frame 227 is pivoted to the center of the frame at 231 and pivoted at one end to a side rail 64 of the trailer bed as indicated at 232 in FIGS. 44 and 45. A raising and lowering handle 233 for the lifting link 230 has guided engagement with a holder 234 on the opposite side rail 64 of the trailer bed. The holder 234, FIG. 44, restrains the link 230 from dropping to the ground when the link 230 and lifting frame 227 are lowered, FIG. 44. Likewise, when these elements are in the up position, FIG. 45, a keeper element 235 on the handle 233 engages above the adjacent side rail 64 to maintain the lifting frame 227 elevated and along with it the truss reliever arms 226 which are attached to the tops of vertical arms 228. By this simple mechanism, the four truss reliever arms 226 may at proper times be raised above the tops of the jig transverse arms so that the truss T resting on the jig is engaged and lifted by the arms 226 above and clear of the several jig stops, whereby there is nothing to interfere with sliding the truss off of the apparatus. At other times, FIG. 44, the truss reliever arms 226 are retracted below the top supporting surfaces of the jig transverse arms such as the arms 132 and 136 shown in FIGS. 44 and 45.

It should also be explained with continuing reference to the drawings that the outer end portions of the various transverse jig arms 134, 135, 136, 137 and 138, etc. are supported by portable legs 236 and 237, FIG. 5, which rest respectively on extension rails 71 and main side rails 64 of the trailer base 60. The legs 236 are carried by small channel sections 238 which straddle the tops of extension rails 71 and are locked thereto by set screws 239. The legs 237 above the main side rails 64 have bases 240, FIG. 4, which engage beneath angle bars 241 fixed to and running for the entire lengths of side rails 64 of the trailer base. Set screws 242 in the bases 240 bear on the tops of side rails 64 and force the bases 240 upwardly to lock them beneath the fixed angle bars 241.

The tops of all of the legs 236 and 237 are bifurcated at 243, FIG. 5, to straddle the vertical webs 244 of the various jig transverse arms. Clamping set screws 245 are provided on the bifurcated legs 236 and 237 so that the latter can be tightly clamped to the webs 244 of the jig arms. The arrangement is similar to that shown and described for the support of the arms 138 in FIGS. 19 and 20.

Figure 16:
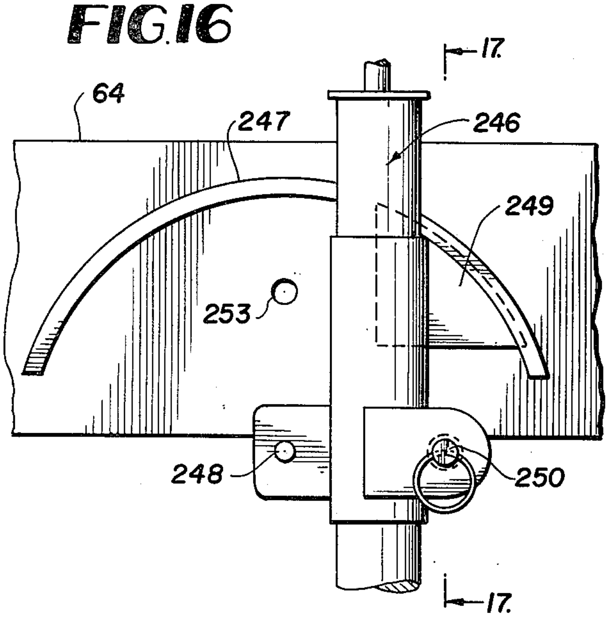
FIG. 16 is a fragmentary side elevation of a jack and associated guiding and locking means.
Figure 17:
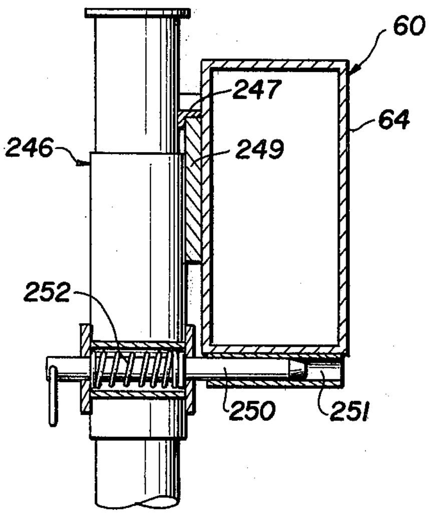
FIG. 17 is a fragmentary vertical section taken on line 17—17 of FIG. 16.

A further feature of the invention comprises providing on opposite sides of the trailer bed 60 near the forward and rear ends thereof ground-engaging jacks 246, FIGS. 16 and 17 and FIGS. 1 and 2. These jacks are swingable to horizontal stowed positions, FIG. 1, for highway transport and are swingable to vertical positions of use, FIG. 2. Each main side rail 64 has arcuate guide tracks 247 on its outer sides for the guidance of jacks as they are pivoted on their pivot pins 248 attached to rails 64. Each jack has an arcuate follower track 249 which follows the arc of the fixed track 247. Each stabilizing jack 246 has a spring-urged lock pin 250 thereon adapted to enter a locking sleeve 251 on the bottom of the adjacent side rail 64 when the pivoted jack has reached the vertical use position. This arrangement safely positions the jack in the vertical use position. The pins 250 are manually retracted against the force of springs 252, FIG. 17, to release the jacks for swinging to the retracted non-use positions shown in FIG. 1. In this position, the spring-urged pins 250 fall into locking holes 253, FIG. 16, provided in trailer bed side rails 64.

In light of the foregoing description of all important components of the invention, its mode of operation or use in fabricating wooden trusses is to a great extent self-evident. However, to briefly summarize use of the apparatus, the complete caravan as shown in FIG. 1 is transported to a job site by means of a towing vehicle. During this transport, the jacks 246 are locked up and the articulated boom 62 is in the stowed position and held by a locking pin 254 in a restrained position with the tower 63.

At the job site, the boom is deployed and the power press is suspended from the boom. The stabilizing jacks 246 are swung down and locked and the extension rails 71 of the trailer bed are extended as required. The various sections of the jig main longitudinal rail 74 are laterally adjusted and locked including the main rail extensions 73, as required. The peak locator 189 is deployed with its support and stabilizing means shown in FIGS. 23 and 24 and the splice locator 215 is installed. The various permanent and swivel stops of the jig are carefully adjusted for the precision location of the lumber to fabricate a truss of a given size and configuration. The entire setting up of the jig 61 can be completed before completion of cutting of lumber, as distinguished from the prior art. This results in a great savings of time plus increased precision and repetitive uniformity in the making of trusses.

When the setting up of the jig is completed and the truss lumber components in place and held firmly by the system of stops and wedge plates on the flip-over locking arms, an operator utilizes the scissor press 101 to apply nailing plates, not shown, across all of the joints in the truss lumber to complete the fabrication of the truss. The use of nailing plates and power presses for installing them is known in the art and need not be further described for the purposes of this invention.

When the fabrication of the truss is completed, the truss reliever arms 226 are raised as explained relative to FIGS. 44 and 45 so that the truss is held above all stops and other obstructions and can be slid bodily off of the apparatus without interference or damage.

The described articulated boom 62 with its unique restraining system and the placement of the laterally adjustable sections of the main jig rail 74 enable the placement of nailing plates over all lumber joints by means of the press 101 conveniently and within the range of movement of the boom and without encountering obstructions to the free manipulation of the power press.

The many advantages of the invention over the prior art should now be apparent to those skilled in the art without the necessity for further description.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A mobile truss fabricating apparatus comprising a trailer bed adapted to be towed to a job site, an articulated boom on the trailer bed rotatable on a vertical axis through a full 360 degrees of rotation in opposite directions, and a truss lumber locating and holding jig on the trailer bed, said jig comprising a main longitudinal jig rail including plural independently laterally adjustable rail sections, means to guide said laterally adjustable rail sections during their adjustment on the trailer bed and to lock them in selected adjusted positions, oppositely projecting transverse jig arms attached to said laterally adjustable main jig rail sections, a series of permanent stops for engagement with a truss bottom chord carried by the transverse jig arms which project from one side of the main jig rail, and a series of swivel stops for engagement with truss pitched members on the transverse jig arms projecting from the other side of said main jig rail.

2. A mobile truss fabricating apparatus as defined in claim 1, and a truss peak locator on said jig and being attached to a pair of said transverse jig arms projecting away from the truss bottom chord side of the jig, and adjustable support and stabilizing means for the outer end portions of said pair of arms and being coupled between the pair of arms and a side longitudinal rail of said trailer bed.

3. A mobile truss fabricating apparatus as defined in claim 2, and a truss bottom chord splice locator mounted on a pair of said transverse jig arms which project away from said truss peak locator and including an adjustable gage element for precisely locating the splice in lumber forming a truss bottom chord.

4. A mobile truss fabricating apparatus as defined in claim 1, and a series of transversely extending parallel truss reliever arms intervened with the transverse jig arms, and means on the trailer bed for raising and lowering the truss reliever arms to elevations above the tops of the transverse jig arms and below such tops.

5. A mobile truss fabricating apparatus as defined in claim 4, and said truss reliever arms being disposed in spaces between the ends of said laterally adjustable main longitudinal jig rail sections.

6. A mobile truss fabricating apparatus as defined in claim 4, and said means for raising and lowering the truss reliever arms comprising a raising and lowering frame for each truss reliever arm movingly and guidably connected with the trailer bed, and a raising and lowering lockable handle means for each raising and lowering frame pivotally connected with one side of the trailer bed.

7. A mobile truss fabricating apparatus as defined in claim 1, and adjustable supporting legs for the outer end portions of said oppositely projecting transverse jig arms mounted on opposite side rails of said trailer bed.

8. A mobile truss fabricating apparatus as defined in claim 1, and stabilizer jacks for the opposite sides of the trailer bed near the fore and aft ends thereof and being pivotally attached to opposite side rails of said bed, and means to releably lock said jacks positively in raised horizontal non-use transport positions and depending vertical use positions.

9. A mobile truss fabricating apparatus as defined in claim 8, and said last-named means including spring-urged locking pins on said jacks engageable selectively within locking openings of said side rails, said locking openings being spaced apart substantially 90 degrees.

10. A mobile truss fabricating apparatus as defined in claim 1, and a pair of adjustable center rail stops mounted on two of said adjustable main jig rail sections and adapted for engagement with pitched sides of a truss undergoing fabrication on the apparatus.

11. A mobile truss fabricating apparatus as defined in claim 2, and said adjustable support and stabilizing means comprising an extensible and retractable longitudinal brace, a pair of extensible and retractable diagonal braces, and a pair of support legs for said pair of jig arms pivotally coupled thereto and coupled with corresponding outer ends of said diagonal braces, said longitudinal brace being coupled between said pair of legs and said diagonal braces.

12. A mobile truss fabricating apparatus as defined in claim 1, and said means to guide said laterally adjustable main jig rail sections comprising support legs rising from cross members of the trailer bed, relatively short transverse slotted horizontal support and guide rails on said legs, and adjustable clamping means connecting the ends of said main jig rail sections with said slotted horizontal support and guide rails.

13. A mobile truss fabricating apparatus as defined in claim 12, and each main jig rail section being of channel cross section including a bottom plate, and said adjustable clamping means comprising a series of clamping set screws having threaded engagement with said bottom plate and extending through the slots of said slotted support and guide rails.

14. A mobile truss fabricating apparatus as defined in claim 1, and said main longitudinal jig rail being of channel cross section and having longitudinal side wall slots along the lengths of its laterally adjustable sections, and quick-release coupling devices on the interior end portions of said oppositely projecting transverse jig arms including swiveled locking heads adapted to be inserted through said side wall slots of said main jig rail sections.

15. A mobile truss fabricating apparatus as defined in claim 14, and said quick-release coupling devices each having a swiveled connection with one of said transverse jig arms and each having a pivoted actuating handle operable to retract the locking head of each coupling device into locking engagement with the interior face of one side wall of each channel cross section main jig rail section.

16. A mobile truss fabricating apparatus as defined in claim 14, and the channel cross section main jig rail having a bottom plate, coninuous longitudinal bars on the bottom plate adjacent the side longitudinal edges thereof, top side wall tubes above and substantially coextensive with said longitudinal bars, spacers between said bars and tubes at widely spaced intervals along the main jig rail to thereby define said side wall slots of the main jig rail, and bolts engaging through said spacers and coupling said tubes and bars with said spacers to said bottom plate of the channel cross section main jig rail.

17. A mobile truss fabricating apparatus as defined in claim 2, and a series of longitudinally spaced permanent support elements for the peak locator on said trailer bed enabling the peak locator and said adjustable support and stabilizing means to be positioned at several different locations along the trailer bed.

18. A mobile truss fabricating apparatus as defined in claim 1, and said articulated boom comprising an upper and a lower boom section, a tower rising from one side of the trailer bed, a vertical axis rotational support for the upper boom section on the tower, an adjustable friction restraint for the upper boom section engageable with a top plate of the tower to regulate freedom of rotation of the upper boom section around said vertical axis rotational support, and a pair of coacting flip-over stops for the upper boom section on the top of the tower enabling the upper boom section to rotate in excess of 360 degrees in opposite directions with freedom but preventing continuous rotation of the upper boom section in either direction.

19. A mobile truss fabricating apparatus as defined in claim 18, and said lower boom section being swiveled on the outer end of the upper boom section for rotation relative to the upper boom section around a vertical axis, and adjustable tension means for the vertical axis swivel of the lower boom section to regulate the freedom of rotation of the lower boom section about said vertical axis.

20. A mobile truss fabricating apparatus as defined in claim 19, and said lower boom being pivoted on the vertical axis swivel for vertical swinging movement relative to the upper boom section, and a fluid pressure adjustable restraining device interconnecting the lower boom section and said swivel and including a fluid restrictor whereby counterbalancing and retarding of the lower boom section on its pivotal axis is achieved without counterweighting the lower boom section.

21. A mobile truss fabricating apparatus as defined in claim 20, and said restraining device comprising an extensible and retractable fluid pressure cylinder-piston unit coupled between the rear end of the lower boom section and said swivel, said rear end of the lower boom section extending for a short distance beyond the pivot axis of the lower boom section compared to the length of the lower boom section beyond said pivot in a forward direction.

22. A mobile truss fabricating apparatus as defined in claim 1, and said trailer bed including a pair of main side rails having opposite end extensions telescopically engaged with the main side rails, said main longitudinal jig rail including opposite end extensions, transverse jig arms projecting from opposite sides of the main rail extensions, and support legs for the last-named jig arms on the trailer bed main side rail extensions.

23. A mobile truss fabricating apparatus as defined in claim 2, and said pair of transverse jig arms to which the truss peak locator is attached comprising T-bars, and attaching devices on opposite ends of the truss peak locator including long clamping nuts engageable in one rotated position beneath the top webs of the T-bars and in second rotated positions being clear of and parallel to the top webs of the T-bars, peak locator clamp screws carrying said long clamping nuts and being threaded therein and being rotatable on the truss peak locator, and fixed stop pins depending from the truss peak locator and being in the rotational path of movement of said nuts to arrest rotation of the nuts in said one and second positions.

* * * * *